United States Patent
Wildes

(10) Patent No.: US 10,917,032 B2
(45) Date of Patent: Feb. 9, 2021

(54) MODULAR SLOPED ROOF SOLAR MOUNTING SYSTEM

(71) Applicant: ECOUNI, LLC, Albuqerque, NM (US)

(72) Inventor: Brian James Wildes, Boulder, CO (US)

(73) Assignee: ECOUNI, LLC, Albuquerque, NM (US)

( * ) Notice: Subject to any disclaimer, the term of this patent is extended or adjusted under 35 U.S.C. 154(b) by 0 days.

(21) Appl. No.: 16/847,540

(22) Filed: Apr. 13, 2020

(65) Prior Publication Data

US 2020/0244213 A1 Jul. 30, 2020

Related U.S. Application Data

(60) Continuation of application No. 16/391,174, filed on Apr. 22, 2019, now Pat. No. 10,622,936, which is a
(Continued)

(51) Int. Cl.
| | |
|---|---|
| *H02S 20/23* | (2014.01) |
| *F16M 13/02* | (2006.01) |
| *F16B 5/02* | (2006.01) |
| *F24S 25/61* | (2018.01) |
| *F24S 25/632* | (2018.01) |

(Continued)

(52) U.S. Cl.
CPC .............. *H02S 20/23* (2014.12); *F24S 25/61* (2018.05); *F24S 25/632* (2018.05); *F24S 25/636* (2018.05); *E04D 1/12* (2013.01); *F16B 5/02* (2013.01); *F16M 13/022* (2013.01);
(Continued)

(58) Field of Classification Search
CPC ........ F24J 2/5245; F24J 2/5254; F24J 2/5258; H02S 20/23; F16M 13/02; F16B 5/02; H01L 31/0482; E04D 1/12
USPC ............. 248/237, 316.4, 316.7, 229.24, 500; 52/173.3, 460, 489.1, 741.1, 555; 136/244, 512
See application file for complete search history.

(56) References Cited

U.S. PATENT DOCUMENTS

| | | |
|---|---|---|
| 1,281,531 A | 10/1918 | Dietrich |
| 2,486,670 A | 11/1949 | Nigg |

(Continued)

FOREIGN PATENT DOCUMENTS

| | | |
|---|---|---|
| EP | 2584282 A1 | 4/2013 |
| EP | 2607816 A1 | 6/2013 |

(Continued)

OTHER PUBLICATIONS

PCT Form 210, International Search Report for PCT/US2012/060032, dated Mar. 18, 2013.
(Continued)

*Primary Examiner* — Tan Le
(74) *Attorney, Agent, or Firm* — Lee & Hayes, P.C.

(57) ABSTRACT

A mounting system for supporting a plurality of photovoltaic modules on a sloped support surface, such as a sloped roof, is disclosed herein. The mounting system may include one or more support surface attachment devices, each support surface attachment device configured to attach one or more photovoltaic modules to a support surface; and one or more module coupling devices, each module coupling device configured to couple a plurality of photovoltaic modules to one another.

20 Claims, 26 Drawing Sheets

Related U.S. Application Data division of application No. 15/817,671, filed on Nov. 20, 2017, now Pat. No. 10,270,383, which is a division of application No. 14/541,127, filed on Nov. 13, 2014, now Pat. No. 9,825,581.

(60) Provisional application No. 62/014,054, filed on Jun. 18, 2014, provisional application No. 61/904,049, filed on Nov. 14, 2013.

(51) Int. Cl.
*F24S 25/636* (2018.01)
*E04D 1/12* (2006.01)

(52) U.S. Cl.
CPC ............ *Y02B 10/10* (2013.01); *Y02B 10/20* (2013.01); *Y02E 10/47* (2013.01)

(56) References Cited

U.S. PATENT DOCUMENTS

| | | | |
|---|---|---|---|
| 2,607,816 A | 8/1952 | Ryder | |
| 3,844,087 A | 10/1974 | Schultz et al. | |
| 4,114,330 A | 9/1978 | Sukolics | |
| 4,677,248 A | 6/1987 | Lacey | |
| 4,680,905 A | 7/1987 | Rockar | |
| 5,092,939 A | 3/1992 | Nath et al. | |
| 5,497,587 A | 3/1996 | Hirai et al. | |
| 5,746,839 A | 5/1998 | Dinwoodie | |
| 6,105,316 A | 8/2000 | Bottger et al. | |
| 6,105,317 A | 8/2000 | Tomiuchi et al. | |
| 6,331,671 B1 | 12/2001 | Makita et al. | |
| 6,360,491 B1 | 3/2002 | Ullman | |
| 6,672,018 B2 | 1/2004 | Shingleton | |
| D510,315 S | 10/2005 | Shugar et al. | |
| 6,959,517 B2 | 11/2005 | Poddany et al. | |
| D519,444 S | 4/2006 | Mascolo | |
| D547,262 S | 7/2007 | Ullman | |
| D560,605 S | 1/2008 | McClintock et al. | |
| D564,958 S | 3/2008 | Almy et al. | |
| D565,505 S | 4/2008 | Shugar et al. | |
| 7,406,800 B2 | 8/2008 | Cinnamon et al. | |
| 7,435,134 B2 | 10/2008 | Lenox | |
| 7,476,832 B2 | 1/2009 | Vendig et al. | |
| D586,737 S | 2/2009 | Shugar et al. | |
| 7,492,120 B2 | 2/2009 | Benn et al. | |
| D598,372 S | 8/2009 | Sasada | |
| 7,592,537 B1 | 9/2009 | West | |
| 7,634,875 B2 | 12/2009 | Genschorek | |
| 7,758,011 B2 | 7/2010 | Haddock | |
| 7,780,472 B2 | 8/2010 | Lenox | |
| 7,832,157 B2 | 11/2010 | Cinnamon | |
| 7,866,098 B2 | 1/2011 | Cinnamon | |
| 7,921,843 B1 | 4/2011 | Rawlings | |
| 7,987,641 B2 | 8/2011 | Cinnamon | |
| 8,109,048 B2 | 2/2012 | West et al. | |
| 8,136,311 B2 | 3/2012 | Liu | |
| 8,146,299 B2 | 4/2012 | Stearns et al. | |
| 8,191,320 B2 | 6/2012 | Mittan et al. | |
| 8,266,848 B2 | 9/2012 | Miros et al. | |
| 8,272,174 B2 | 9/2012 | Stearns et al. | |
| 8,276,330 B2 | 10/2012 | Harberts et al. | |
| 8,375,654 B1 | 2/2013 | West et al. | |
| 8,382,513 B2 | 2/2013 | Kobayashi | |
| 8,397,448 B2 | 3/2013 | Brown et al. | |
| 8,424,255 B2 | 4/2013 | Lenox et al. | |
| 8,448,405 B2 | 5/2013 | Schaefer et al. | |
| 8,505,248 B1 | 8/2013 | Leong et al. | |
| 8,505,864 B1 | 8/2013 | Taylor et al. | |
| 8,511,008 B2 | 8/2013 | Sagayama | |
| 8,539,719 B2 | 9/2013 | McPheeters et al. | |
| D692,372 S | 10/2013 | Rothschild et al. | |
| 8,555,569 B2 | 10/2013 | Crasnianski | |
| 8,557,081 B2 | 10/2013 | Sha et al. | |
| 8,627,617 B2 | 1/2014 | Haddock et al. | |
| 8,635,818 B2 | 1/2014 | Wildes | |
| 8,756,881 B2 | 6/2014 | West et al. | |
| 8,806,813 B2 * | 8/2014 | Plaisted | H01R 4/64 52/173.3 |
| D713,784 S | 9/2014 | Wildes | |
| 8,844,215 B2 | 9/2014 | Wildes et al. | |
| 8,869,471 B2 | 10/2014 | Wildes et al. | |
| 9,175,878 B2 | 11/2015 | Kemmer | |
| 9,196,755 B2 | 11/2015 | Wildes | |
| 9,209,609 B2 | 12/2015 | Kellerman | |
| 9,397,607 B2 | 7/2016 | Atchley et al. | |
| 9,413,285 B2 | 8/2016 | Wildes et al. | |
| 9,825,581 B2 * | 11/2017 | Wildes | H02S 20/23 |
| 10,270,383 B2 | 4/2019 | Wildes | |
| 10,622,936 B2 | 4/2020 | Wildes | |
| 2001/0053316 A1 | 12/2001 | Bakker | |
| 2003/0070368 A1 | 4/2003 | Shingleton | |
| 2004/0163338 A1 | 8/2004 | Liebendorfer | |
| 2005/0072456 A1 | 4/2005 | Stevenson et al. | |
| 2005/0166955 A1 | 8/2005 | Nath et al. | |
| 2005/0257453 A1 | 11/2005 | Cinnamon | |
| 2006/0086382 A1 | 4/2006 | Plaisted | |
| 2006/0118163 A1 | 6/2006 | Plaisted et al. | |
| 2007/0095388 A1 | 5/2007 | Mergola et al. | |
| 2007/0144575 A1 | 6/2007 | Mascolo et al. | |
| 2008/0053517 A1 | 3/2008 | Plaisted et al. | |
| 2008/0172955 A1 | 7/2008 | McClintock et al. | |
| 2009/0019796 A1 | 1/2009 | Liebendorfer | |
| 2009/0078299 A1 | 3/2009 | Cinnamon et al. | |
| 2009/0134291 A1 | 5/2009 | Meier et al. | |
| 2009/0242014 A1 | 10/2009 | Leary | |
| 2009/0320904 A1 | 12/2009 | Botkin et al. | |
| 2009/0320905 A1 | 12/2009 | Botkin et al. | |
| 2009/0320906 A1 | 12/2009 | Botkin et al. | |
| 2009/0320907 A1 | 12/2009 | Botkin et al. | |
| 2010/0089390 A1 | 4/2010 | Miros et al. | |
| 2010/0147362 A1 | 6/2010 | King et al. | |
| 2010/0154780 A1 | 6/2010 | Linke | |
| 2010/0192505 A1 | 8/2010 | Schaefer | |
| 2010/0212714 A1 | 8/2010 | Rothschild et al. | |
| 2010/0219304 A1 | 9/2010 | Miros et al. | |
| 2010/0236542 A1 | 9/2010 | Pierson et al. | |
| 2010/0263704 A1 | 10/2010 | Fornage et al. | |
| 2010/0269428 A1 | 10/2010 | Stancel et al. | |
| 2010/0269430 A1 | 10/2010 | Haddock | |
| 2011/0000519 A1 | 1/2011 | West | |
| 2011/0000520 A1 | 1/2011 | West | |
| 2011/0000526 A1 | 1/2011 | West | |
| 2011/0000544 A1 | 1/2011 | West | |
| 2011/0056536 A1 | 3/2011 | Meppelink et al. | |
| 2011/0120047 A1 | 5/2011 | Stearns et al. | |
| 2011/0179727 A1 | 7/2011 | Liu | |
| 2011/0220180 A1 | 9/2011 | Cinnamon et al. | |
| 2011/0260027 A1 | 10/2011 | Farnham, Jr. | |
| 2011/0278411 A1 | 11/2011 | Carbonare et al. | |
| 2011/0284058 A1 | 11/2011 | Cinnamon | |
| 2012/0031473 A1 | 2/2012 | Chan et al. | |
| 2012/0032045 A1 | 2/2012 | Lallier et al. | |
| 2012/0048351 A1 | 3/2012 | Rizzo | |
| 2012/0061337 A1 | 3/2012 | Seery et al. | |
| 2012/0138764 A1 | 6/2012 | Kemple | |
| 2012/0234378 A1 | 9/2012 | West et al. | |
| 2012/0240489 A1 | 9/2012 | Rivera et al. | |
| 2012/0255598 A1 | 10/2012 | West | |
| 2012/0260972 A1 | 10/2012 | West et al. | |
| 2012/0266944 A1 | 10/2012 | Wildes | |
| 2012/0275066 A1 | 11/2012 | O'Brien et al. | |
| 2012/0279558 A1 | 11/2012 | West et al. | |
| 2012/0298186 A1 | 11/2012 | West | |
| 2012/0298188 A1 | 11/2012 | West et al. | |
| 2012/0298817 A1 | 11/2012 | West et al. | |
| 2013/0032208 A1 | 2/2013 | Walz et al. | |
| 2013/0075152 A1 | 3/2013 | Mazzone | |
| 2013/0133270 A1 | 5/2013 | West et al. | |
| 2013/0133723 A1 | 5/2013 | Croft et al. | |
| 2013/0140416 A1 | 6/2013 | West et al. | |
| 2013/0180089 A1 | 7/2013 | Seery et al. | |
| 2013/0180572 A1 | 7/2013 | West | |
| 2013/0180573 A1 | 7/2013 | West | |

(56) References Cited

U.S. PATENT DOCUMENTS

| | | | |
|---|---|---|---|
| 2013/0180574 A1 | 7/2013 | West et al. | |
| 2013/0183084 A1 | 7/2013 | West et al. | |
| 2013/0200245 A1 | 8/2013 | Markiewicz et al. | |
| 2013/0220403 A1 | 8/2013 | Rizzo | |
| 2013/0276867 A1 | 10/2013 | Wildes et al. | |
| 2013/0299656 A1 | 11/2013 | Kemmer et al. | |
| 2014/0014158 A1 | 1/2014 | Wildes et al. | |
| 2014/0041706 A1 | 2/2014 | Haddock et al. | |
| 2014/0174510 A1 | 6/2014 | Kanbara | |
| 2014/0175244 A1 | 6/2014 | West et al. | |
| 2014/0182662 A1 | 7/2014 | West et al. | |
| 2014/0202525 A1 | 7/2014 | Janssens et al. | |
| 2014/0220834 A1 | 8/2014 | Rizzo | |
| 2014/0311552 A1 | 10/2014 | Garrett | |
| 2014/0319307 A1 | 10/2014 | Schrock et al. | |
| 2015/0040969 A1 | 2/2015 | Wildes | |
| 2015/0244308 A1 | 8/2015 | Patton et al. | |
| 2015/0288320 A1* | 10/2015 | Stearns | F24S 25/40 52/173.3 |
| 2016/0079912 A1 | 3/2016 | Wildes et al. | |
| 2016/0126884 A1* | 5/2016 | Stearns | F24S 25/636 52/173.3 |
| 2016/0190979 A1 | 6/2016 | Wildes | |
| 2016/0268958 A1* | 9/2016 | Wildes | F24S 25/70 |

FOREIGN PATENT DOCUMENTS

| | | |
|---|---|---|
| FR | 2990730 A1 | 11/2013 |
| GB | 2466003 B | 6/2010 |
| JP | 07018795 A | 1/1995 |
| JP | 09177272 A | 7/1997 |
| JP | 2004060358 A | 2/2004 |
| JP | 2008214875 A | 9/2008 |
| JP | 2013044114 A | 3/2013 |
| JP | 2013-87579 A | 5/2013 |
| JP | WO2011/077538 A1 | 5/2013 |
| JP | 2013-227859 A | 7/2013 |
| WO | 2005020290 A2 | 3/2005 |
| WO | 2008/028151 A2 | 3/2008 |
| WO | 2009120923 A2 | 10/2009 |
| WO | 2011025585 A2 | 3/2011 |
| WO | 2011019460 A2 | 8/2011 |
| WO | 2012/086271 A1 | 6/2012 |
| WO | 2012079060 A2 | 6/2012 |
| WO | 2012079061 A1 | 6/2012 |
| WO | 2012082806 A2 | 6/2012 |
| WO | 2012116121 A1 | 8/2012 |

OTHER PUBLICATIONS

PCT Form 237, Written Opinion of the International Searching Authority for PCT/US2012/060032, dated Mar. 18, 2013.

First office action on the merits (Non-Final Rejection) in U.S. Appl. No. 13/273,525, dated Mar. 21, 2013.

First office action on the merits (Non-Final Rejection) in U.S. Appl. No. 13/923,303, dated Sep. 20, 2013.

First office action on the merits (Non-Final Rejection) in U.S. Appl. No. 13/923,342, dated Sep. 17, 2013.

PCT Form 210, International Search Report for PCT/US2013/049851, dated Nov. 7, 2013.

PCT Form 237, Written Opinion of the International Searching Authority for PCT/US2013/049851, dated Nov. 7, 2013.

First office action on the merits (Non-Final Rejection) in U.S. Appl. No. 14/521,951, dated Jan. 30, 2015.

PCT Form 210, International Search Report for PCT/US2014/065624, dated Apr. 9, 2015.

PCT Form 237, Written Opinion of the International Searching Authority for PCT/US2014/065624, dated Apr. 9, 2015.

PCT Form 210, International Search Report for PCT/US2016/022219, dated Jul. 26, 2016.

PCT Form 237, Written Opinion of the International Searching Authority for PCT/US2016/022219, dated Jul. 26, 2016.

First office action on the merits (Non-Final Rejection) in U.S. Appl. No. 14/948,342, dated Dec. 22, 2015.

First office action on the merits (Non-Final Rejection) in U.S. Appl. No. 15/068,370, dated Jul. 21, 2017.

First office action on the merits (Non-Final Rejection) in U.S. Appl. No. 14/541,127, dated Apr. 7, 2016.

Second office action on the merits (Final Rejection) in U.S. Appl. No. 14/541,127, dated Dec. 7, 2016.

Third office action on the merits (Non-Final Rejection) in U.S. Appl. No. 14/541,127, dated Apr. 18, 2017.

First office action on the merits (Notice of Rejection) from Japanese Patent Office (JPO) for Japanese Patent Appl. No. 2016-530120, dated Oct. 23, 2018.

First office action on the merits (Non-Final Rejection) in U.S. Appl. No. 15/817,671, dated Feb. 7, 2018.

Second office action on the merits (Final Rejection) in U.S. Appl. No. 15/817,671, dated Aug. 22, 2018.

First office action on the merits (Non-Final Rejection) in U.S. Appl. No. 16/391,174, dated Jun. 25, 2019.

* cited by examiner

SECTION A-A

SECTION B-B

SECTION C-C

DETAIL "A"

MODULAR SLOPED ROOF SOLAR MOUNTING SYSTEM

CROSS-REFERENCE TO RELATED APPLICATIONS

This is a continuation of U.S. patent application Ser. No. 16/391,174, entitled "Modular Sloped Roof Solar Mounting System", filed on Apr. 22, 2019; and U.S. Nonprovisional patent application Ser. No. 16/391,174 is a divisional of U.S. patent application Ser. No. 15/817,671, entitled "Modular Sloped Roof Solar Mounting System", filed on Nov. 20, 2017, now U.S. Pat. No. 10,270,383; and U.S. Nonprovisional patent application Ser. No. 15/817,671 is a divisional of U.S. patent application Ser. No. 14/541,127, entitled "Modular Sloped Roof Solar Mounting System", filed on Nov. 13, 2014, now U.S. Pat. No. 9,825,581; which claims priority to U.S. Provisional Patent Application No. 61/904,049, entitled "Modular Sloped Roof Solar Mounting System", filed on Nov. 14, 2013, and further claims priority to U.S. Provisional Patent Application No. 62/014,054, entitled "Modular Sloped Roof Mounting System", filed on Jun. 18, 2014, the disclosure of each of which is hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

FIELD OF THE INVENTION

The field of the present invention generally relates to mounting systems and, more particularly, to support assemblies and mounting systems for mounting photovoltaic modules or panels on sloped support surfaces such as, for example, sloped building rooftops, or the like.

BACKGROUND OF THE INVENTION

There is a need for a sloped roof solar mounting system that attaches to rafters or roof supporting members, avoids using rails or struts, and is universal.

Solar panels must be secured to the roof and underlying structure to disperse wind and snow loads into the building structure. Although some mounting systems that avoid using rails attach to the roof decking, they do not attach to the roof rafters because the spacing of rafters is different than the length of modules.

Rails and struts are long extrusions or roll-formed strips that must be cut to length, use excess material, are costly to manufacture and high in shipping cost. Therefore, a mounting system avoiding the use of rails or struts is desired.

There is a need for the system to mount to any solar module on the market, giving installers the flexibility to choose the module of their choice, rather than be required to buy a module with a custom profile rail to accommodate the mounting system.

BRIEF SUMMARY OF EMBODIMENTS OF THE INVENTION

Accordingly, the present invention is directed to a modular sloped roof solar mounting system that substantially obviates one or more problems resulting from the limitations and deficiencies of the related art.

In accordance with one or more embodiments of the present invention, there is provided a support surface attachment device configured to attach one or more photovoltaic modules to a support surface. The support surface attachment device includes a lower support member configured to be attached to a support surface; and a clamp assembly configured to engage one or more photovoltaic modules, the clamp assembly configured to be fixed in place relative to the lower support member. In these one or more embodiments, the clamp assembly is capable of being selectively positioned along a length of the lower support member prior to being fixed in place relative to the lower support member so as to permit adjustability when the one or more photovoltaic modules are being attached to the support surface.

In a further embodiment of the present invention, the clamp assembly of the support surface attachment device comprises a lower clamp member and an upper clamp member, the upper clamp member connected to the lower clamp member by a threaded fastening device.

In yet a further embodiment, the lower clamp member of the clamp assembly comprises a pair of ledges extending outwardly from oppositely disposed outer side surfaces of the lower clamp member, one of the pair of ledges comprising a groove disposed therein for receiving a portion of a skirt mounting member.

In still a further embodiment, the support surface attachment device further comprises an upper support member, the upper support member configured to operate as a handle for rotating the clamp assembly relative to the lower support member, and thereby lock the clamp assembly in place relative to the lower support member.

In yet a further embodiment, the threaded fastening device further connects the clamp assembly to the upper support member.

In still a further embodiment, the support surface attachment device further comprises a cam-type locking mechanism that locks the clamp assembly in place relative to the lower support member without the use of tools.

In accordance with one or more other embodiments of the present invention, there is provided a coupling device configured to attach one or more photovoltaic modules to one or more other photovoltaic modules. The coupling device includes a lower coupling member including at least one ledge extending outwardly from a side surface of the lower coupling member; and an upper coupling member including at least one flange portion extending outwardly from the upper coupling member, the upper coupling member being adjustably connected to the lower coupling member by at least one fastening device. In these one or more other embodiments, the one or more photovoltaic modules and the one or more other photovoltaic modules are configured to be clamped between the at least one ledge of the lower coupling member and the at least one flange portion of the upper coupling member.

In a further embodiment of the present invention, the lower coupling member further includes a pair of generally vertical walls having oppositely disposed outer side surfaces, and wherein the at least one ledge comprises a pair of ledges extending outwardly from the oppositely disposed outer side surfaces of the generally vertical walls.

In accordance with yet one or more other embodiments of the present invention, there is provided a support surface attachment device configured to attach one or more photovoltaic modules to a support surface. The support surface attachment device includes a rotatable base member, the rotatable base member being pivotal about a central rotational axis, the rotatable base member configured to be attached to a support surface; and a clamp assembly configured to engage one or more photovoltaic modules, the clamp assembly coupled to the rotatable base member. In these one or more other embodiments, the clamp assembly is capable of being selectively positioned along a circumferential path of the rotatable base member prior to the rotatable base member being fixed in place relative to the support surface so as to permit adjustability when the one or more photovoltaic modules are being attached to the support surface.

In a further embodiment of the present invention, the clamp assembly of the support surface attachment device comprises a lower clamp member and an upper clamp member, the upper clamp member connected to the lower clamp member by a first threaded fastening member.

In yet a further embodiment, the support surface attachment device further comprises a second threaded fastening member, the second threaded fastening member coupling the clamp assembly to the rotatable base member.

In still a further embodiment, the support surface attachment device further comprises a flashing member having a fastener aperture configured to receive a fastener for attaching the rotatable base member and the flashing member to the support surface, the fastener aperture being disposed through a raised position of the flashing member so that water is prevented from passing through the fastener aperture.

In accordance with still one or more other embodiments of the present invention, there is provided a mounting system for supporting a plurality of photovoltaic modules on a support surface. The mounting system includes a support surface attachment device, the support surface attachment device configured to attach one or more photovoltaic modules to a support surface, the support surface attachment device including a clamp assembly, and the clamp assembly including at least one upwardly tapered ledge extending from an outer side of the clamp assembly. In these one or more other embodiments, the at least one upwardly tapered ledge is configured to function as a spring for applying a compressive force against the one or more photovoltaic modules so as to securely retain the one or more photovoltaic modules in the clamp assembly.

In a further embodiment of the present invention, the clamp assembly is capable of being attached anywhere along a peripheral edge of the one or more photovoltaic modules.

In yet a further embodiment, the mounting system further comprises a module coupling device, the module coupling device configured to attach one or more photovoltaic modules to one or more other photovoltaic modules.

In yet a further embodiment, the mounting system does not include a mounting rail that is configured to span multiple photovoltaic modules.

In accordance with yet one or more other embodiments of the present invention, there is provided a mounting system for supporting a plurality of photovoltaic modules on a support surface. The mounting system includes a support surface attachment device, the support surface attachment device configured to attach one or more photovoltaic modules to a support surface, the support surface attachment device including a clamp assembly, the clamp assembly including a lower clamp member and an upper clamp member, the lower clamp member having an outwardly extending component extending from an outer side of the lower clamp member; a skirt mounting member, the skirt mounting member comprising a first plurality of protrusions; and a skirt member, the skirt member comprising a second plurality of protrusions, the second plurality of protrusions on the skirt member configured to matingly engage the first plurality of protrusions on the skirt mounting member.

In a further embodiment of the present invention, the skirt mounting member comprises a downwardly extending portion configured to engage with a groove in the outwardly extending component of the lower clamp member of the clamp assembly; and wherein the skirt member is configured to engage with the upper clamp member of the clamp assembly.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

It will be apparent to those skilled in the art, that is, to those who have knowledge or experience in this area of technology, that many uses and design variations are possible for the improved mounting systems and methods disclosed herein. The following detailed discussion of various alternative and preferred embodiments will illustrate the general principles of the invention with regard to the specific application of rooftop mounted photovoltaic (PV) modules that are in the form of rectangular-shaped panels. Other embodiments suitable for other applications will be apparent to those skilled in the art given the benefit of this disclosure such as for example, PV modules having different shapes.

Figure 25:
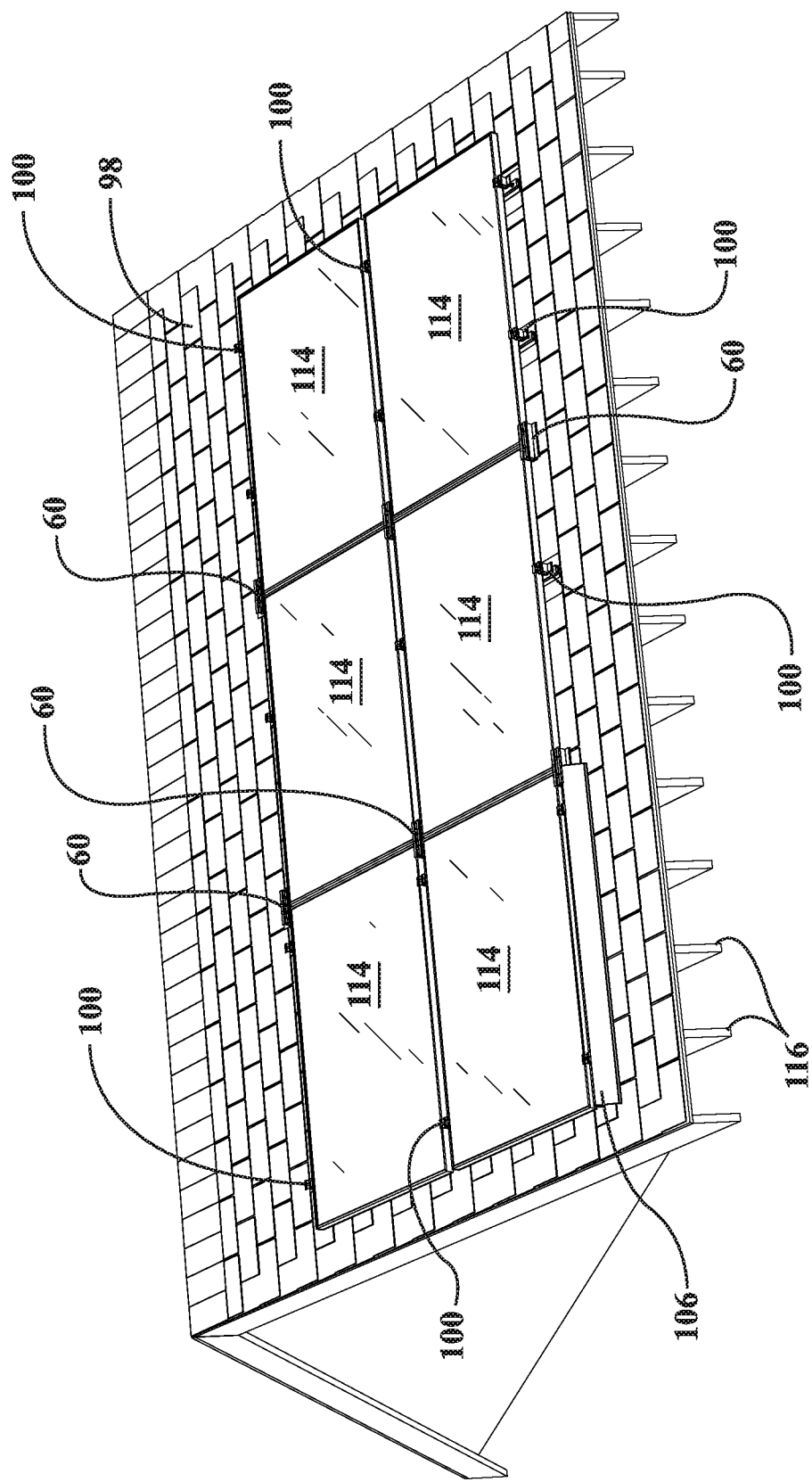
FIG. 25 is a perspective view of the illustrative mounting system described herein being used to secure an array of photovoltaic modules to a sloped roof.

With initial reference to the perspective view FIG. 25, the constituent components of an illustrative photovoltaic mounting system will be generally described. FIG. 25 illustrates a roof-mounted photovoltaic system or array according to an embodiment of the present invention. The illustrated photovoltaic system or array includes an array of solar panels or PV modules 114 mounted to a pitched or sloped support surface in the form of a building rooftop 98 by a mounting system. In FIG. 25, there are two rows of PV modules 114 illustrated for exemplary purposes, each of the two rows having three (3) PV modules 114 disposed therein. The illustrated mounting system includes a plurality of support surface attachment devices 100 that secure the array of PV modules 114 to the building rooftop 98. As shown in FIG. 25, the five (5) support surface attachment devices 100 disposed in the middle of the PV array bridge the two rows of PV modules 114. The PV array illustrated in FIG. 25 has each of the rectangular-shaped PV modules 114 oriented in a landscape orientation, that is, with the longest axis of the PV modules 114 extending in a lateral or side-to-side direction which is typically the east-west direction. It is noted, however, that the PV modules 114 can alternatively be oriented by the support surface attachment devices 114 in a portrait orientation, that is, with the longest axis of the PV modules 114 extending in a forward-rearward direction which is typically the south-north direction. With reference again to FIG. 25, it can be seen that the illustrated mounting system also includes a plurality of coupling devices 60 that rigidly fasten a plurality of PV modules 114 to one another. As shown in FIG. 25, the coupling devices 60 connect the corners of adjacent PV modules 114 together. While not visible in FIG. 25, the mounting system may further include a plurality of bracket assemblies 120 for securing one or more respective electrical assemblies to the underside of one or more PV modules 114.

Figure 3:
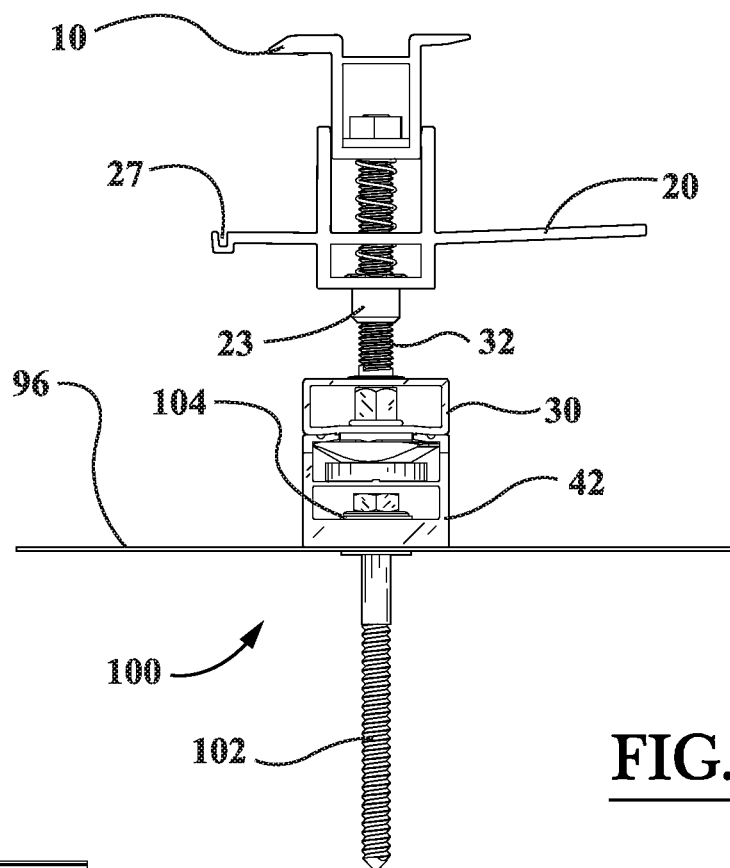
FIG. 3 is an end view of the support surface attachment device of FIG. 1, wherein the clamp assembly of the support surface attachment device is in an engaged position with respect to the lower support member.
Figure 4:
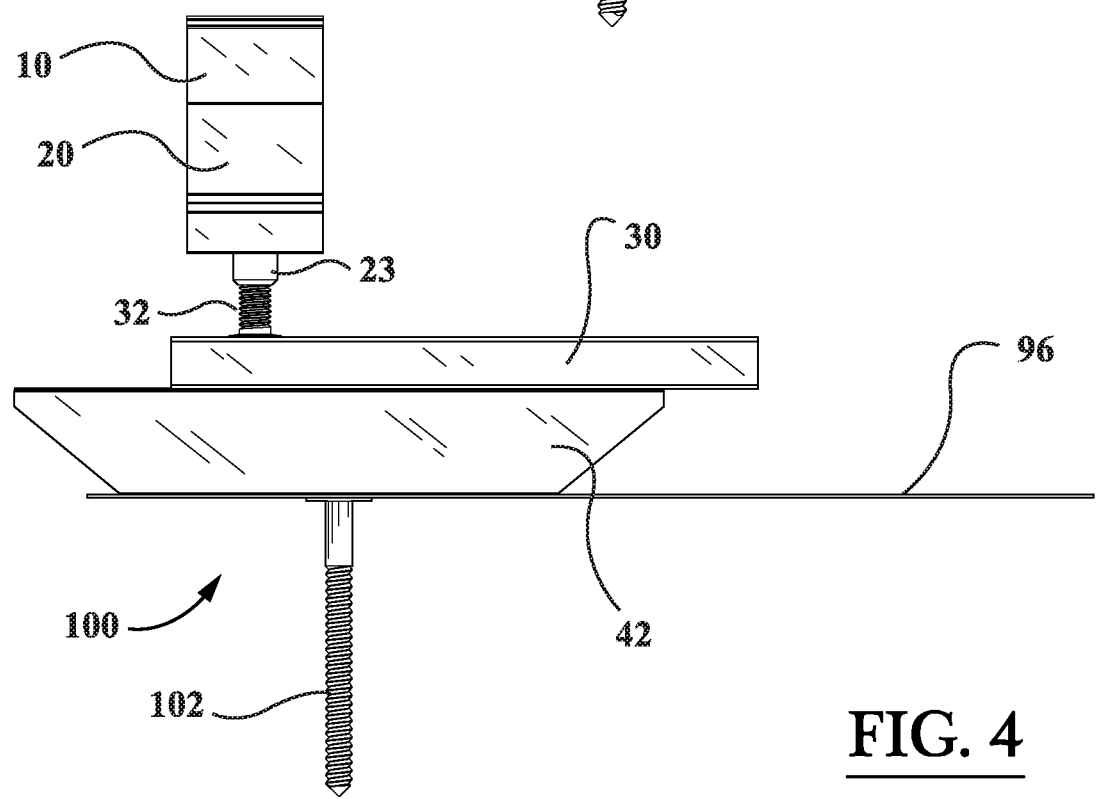
FIG. 4 is a side view of the support surface attachment device of FIG. 1, wherein the clamp assembly of the support surface attachment device is in an engaged position with respect to the lower support member.

As shown in the perspective view of FIG. 25, in a first embodiment, each illustrated PV module 114 is supported by a plurality of the support surface attachment devices 100. Each support surface attachment device 100 is connected to at least one of the PV modules 114 but some of the illustrated support surface attachment devices 100 are connected to more than one of the PV modules 114 (e.g., the five (5) support surface attachment devices 100 connected between the two (2) of PV modules 114). The illustrated PV modules 114 are secured to the support surface attachment devices 100 (as described in more detail hereinafter) but each of the support surface attachment devices 100 is not directly secured to any of the other support surface attachment devices 100 (e.g., there is no rail member connecting one support surface attachment device 100 to another support surface attachment device 100). It is noted that non-load bearing components, such as skirt members, and the like can also be supported by the support surface attachment devices 100 as described in more detail hereinafter. Advantageously, the mounting system described herein is capable of being used with PV modules 114 of any width and length without requiring customization or modification to the support surface attachment devices 100 or the PV modules 114. Thus, a common support surface attachment device 100 can be used in many applications to mount many different models of PV modules 114. In the illustrated embodiment of FIG. 25, each support surface attachment device 100 is secured to a respective one of the roof rafters 116 by means of a structural mounting screw 102 (e.g., refer to FIGS. 3 and 4). In one or more embodiments, the structural mounting screw 102 may be self-drilling so as not to require any predrilled holes in the roof.

Figure 1:
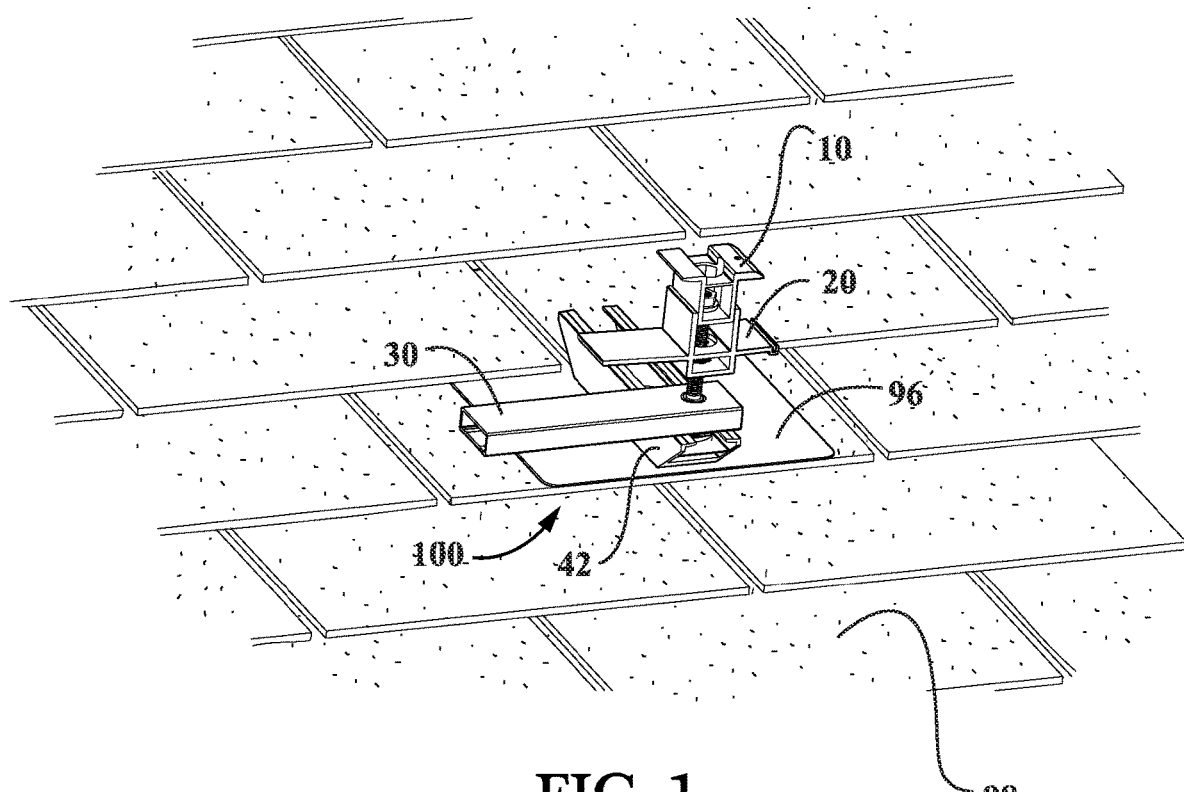
FIG. 1 is a perspective view of a support surface attachment device of a photovoltaic mounting system, according to a first illustrative embodiment of the invention, wherein a clamp assembly of the support surface attachment device is in a disengaged position with respect to the lower support member, and the support surface attachment device is shown installed on a roof.
Figure 2:
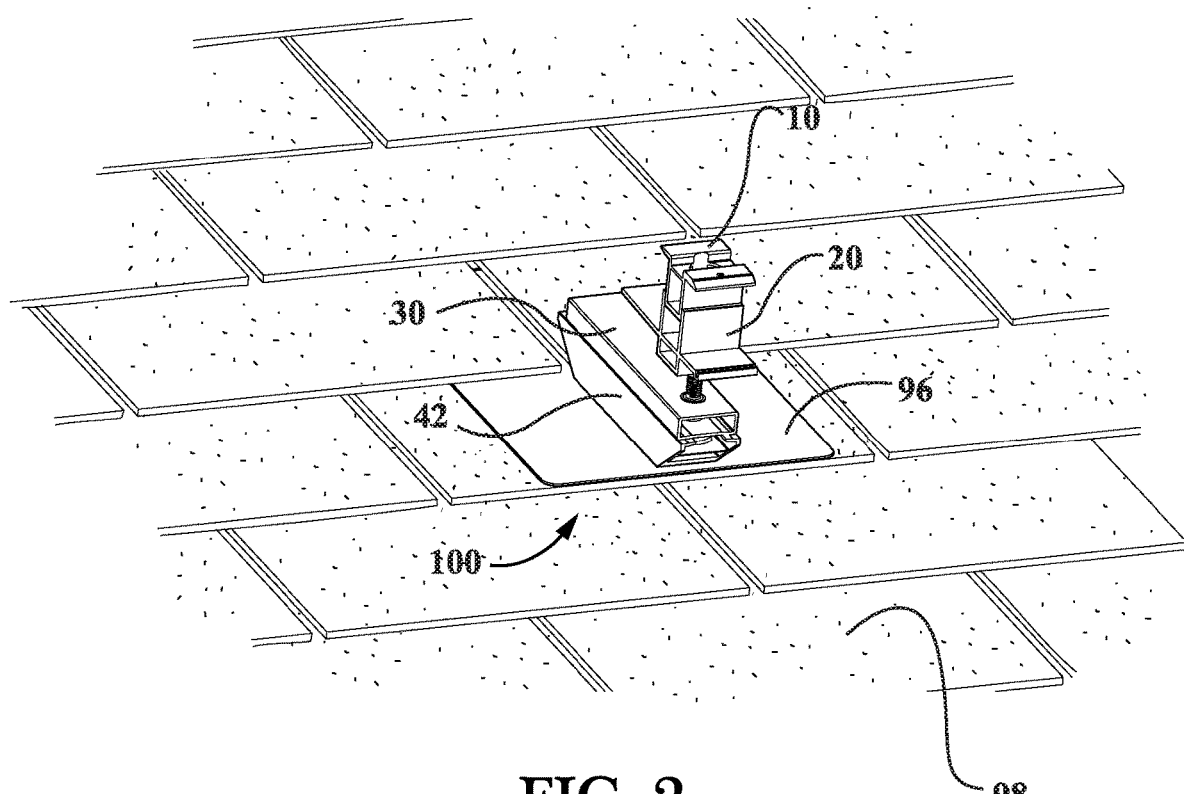
FIG. 2 is a perspective view of the support surface attachment device of FIG. 1, wherein the clamp assembly of the support surface attachment device is in an engaged position with respect to a lower support member.

Now, turning initially to FIGS. 3-7, the components of the support surface attachment devices 100 (i.e., the mounting assemblies 100) illustrated in FIG. 25 will be described. As shown in these figures, in a first embodiment, each support surface attachment device 100 generally comprises a lower support member 42 configured to be attached to a support surface (e.g., the building rooftop 98 of FIG. 25); and a clamp assembly 50 configured to engage one or more PV modules 114, the clamp assembly 50 is configured to be locked in place relative to the lower support member 42 without the use of tools. In particular, as best illustrated in FIGS. 1 and 2, when the upper tubular support member 30 is turned approximately 90 degrees clockwise by a user thereof (i.e., a PV system installer), the clamp assembly 50 is capable of being locked in place relative to the lower support member 42 without the use of a tool (e.g., wrench, etc.). Because the clamp assembly 50 can be locked in place anywhere along the length of the lower support member 42, the necessary mounting location of the PV modules 114 can be easily accommodated after the lower support member 42 has been fixedly attached to the roof rafter 116 by means of the structural mounting screw 102. As such, it is not necessary for the lower support member 42 to be precisely located along the length of the roof rafter 116 because the support surface attachment device 100 described herein advantageously affords generous adjustability in the south-north installation direction and/or east-west installation direction. Also, the support surface attachment devices 100 can also be flexibly located in the east-west direction on the building rooftop 98 such that they correspond with the spacing of the roof rafters 116 because the support surface attachment devices 100 can be mounted virtually anywhere along the length (i.e., east-west direction) of the PV modules 114.

Figure 17:
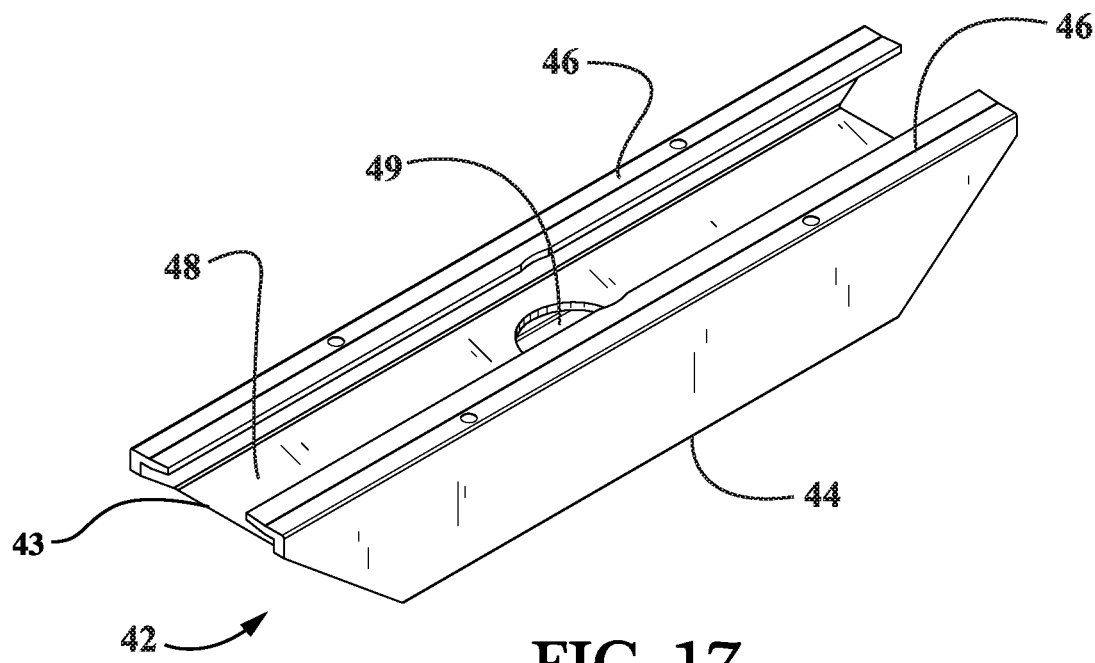
FIG. 17 is a lower support member of the support surface attachment device of FIGS. 3 and 4.
Figure 18:
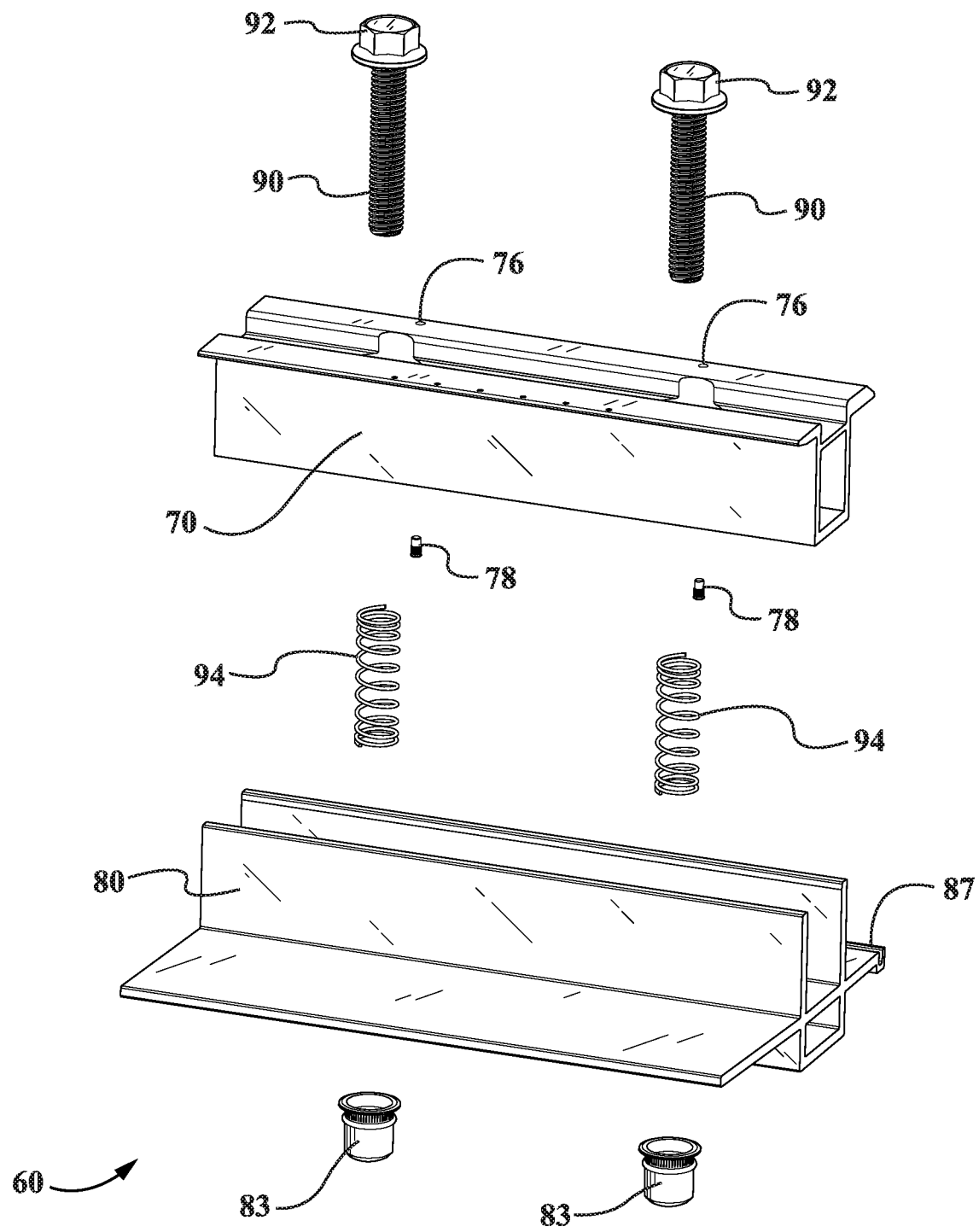
FIG. 18 is an exploded perspective view of the coupling device of FIG. 11.
Figure 20:
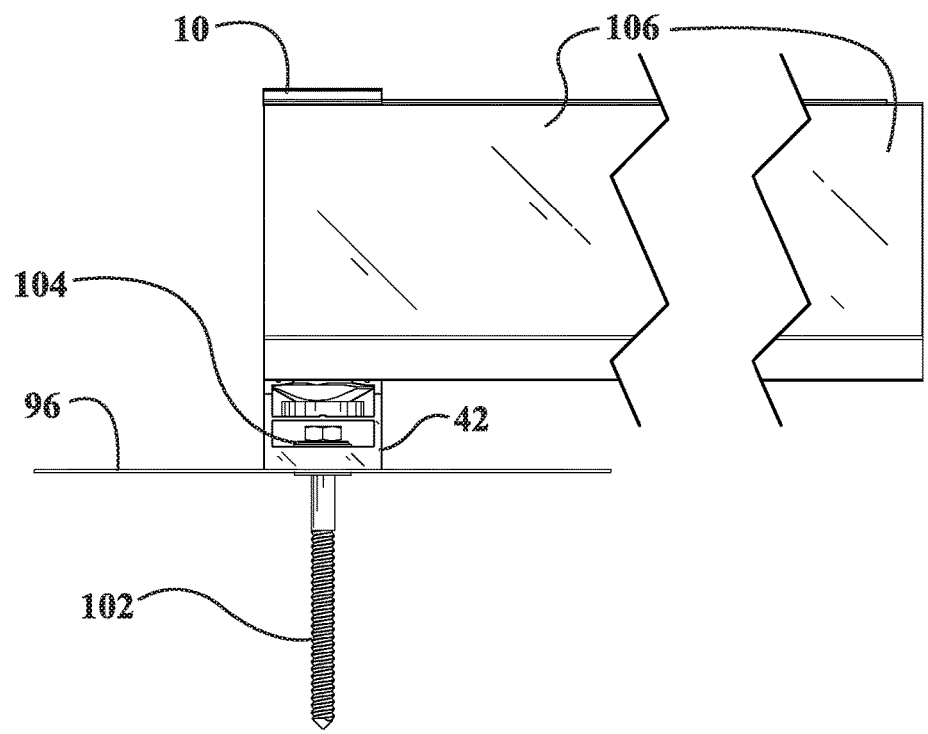
FIG. 20 is a front end view of the support surface attachment device and lower skirt member of FIG. 19.

As shown in FIG. 17, the lower support member 42 generally comprises a base portion 44, a ledge or shelf portion elevated above the base portion 44, and opposed flange portions 46 disposed above the ledge or shelf portion. As illustrated in this figure, the opposed flange portions 46 define a locking mechanism slot 48 for receiving the locking cap member 38 of the clamp assembly 50 disposed therein. The locking cap member 38, which operates as a cam-like locking mechanism, locks the clamp assembly 50 in place relative to the lower support member 42 when the handle-like tubular member 30 is turned approximately 90 degrees clockwise by a user thereof (i.e., a PV system installer). As shown in FIG. 17, the ledge or shelf portion of the lower support member 42, which is elevated above the base portion 44 thereof, comprises an aperture 49 disposed therein for accommodating the passage of a tool for driving the structural mounting screw 102 into the roof rafter 116 (e.g., a socket wrench for driving the structural mounting screw 102 into the roof rafter 116). While not explicitly visible in the perspective view of FIG. 17, the base portion 44 of the lower support member 42 comprises a fastener aperture disposed therethrough for accommodating the structural mounting screw 102. This fastener aperture in the base portion 44 of the lower support member 42 is disposed directly below, and is generally aligned with, the aperture 49. Referring to FIG. 20, it can be seen that a sealing washer 104 may be provided between the head of the structural mounting screw 102 and the base portion 44 of the lower support member 42 for adding redundancy to the waterproofing of the support surface attachment device 100. As shown in FIG. 17, the lower support member 42 may have a generally trapezoidal shape. The lower support member 42 provides north-south mounting flexibility and/or east-west mounting flexibility. In one exemplary embodiment, the lower support member 42 may be formed from aluminum, the structural mounting screw 102 may be formed from stainless steel, and the sealing washer 104 may be formed from stainless steel with an ethylene propylene diene monomer (EPDM) sealing ring.

With reference to FIGS. 1-4, it can be seen that the support surface attachment device 100 may further include a plate-like flashing member 96. The flashing member 96 is configured to be slipped underneath a shingle course so that a northern portion of the flashing member 96 is disposed underneath the shingle course and a top surface of a southern portion of the flashing member 96 is exposed for accommodating the mounting of the lower support member 42 on the top thereof (e.g., see FIG. 1). The flashing member 96 helps to maintain the integrity of the building roof 98 by preventing roof leaks. In one exemplary embodiment, the flashing member 96 may be formed from aluminum, and may include an ethylene propylene diene monomer (EPDM) grommet for superior waterproofing around the aperture that receives the structural mounting screw 102. In one or more embodiments, the structural mounting screw 102 attaches through the sealing washer 104, the lower support member 42, the EDPM grommet, and the flashing member 96 so as to securely affix the mounting assembly 100 to a roof rafter 116 in a waterproof manner. Also, in one exemplary embodiment, the upper and lower clamp members 10, 20 and the upper support member 30 may be formed from aluminum, and the threaded fastening device 32 (e.g., bolt) may be formed from stainless steel.

Figure 5:
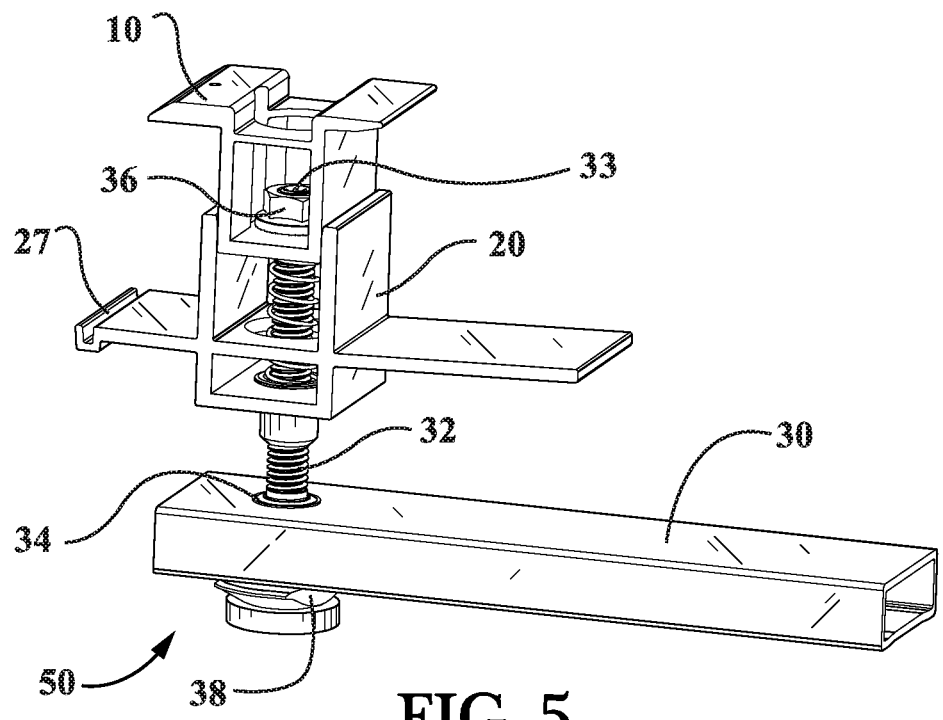
FIG. 5 is a side perspective view of a clamp assembly of the support surface attachment device of FIGS. 3 and 4.
Figure 6:
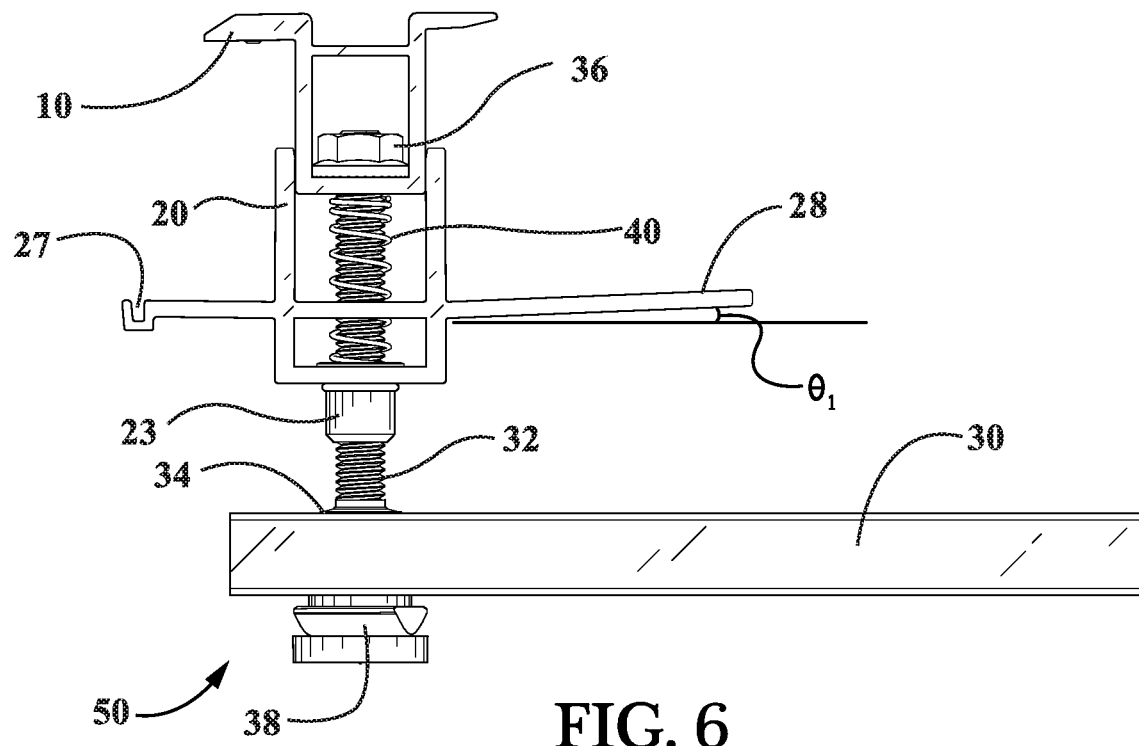
FIG. 6 is a side view of the clamp assembly of FIG. 5.
Figure 7:
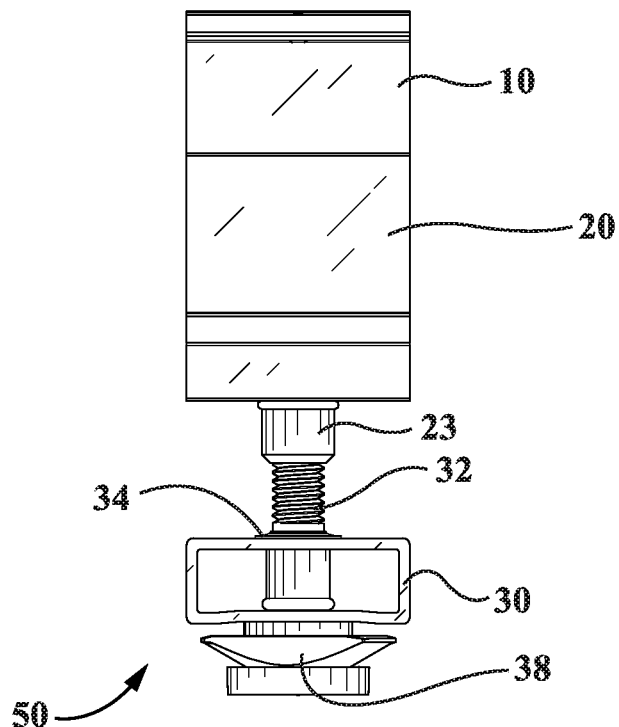
FIG. 7 is an end view of the clamp assembly of FIG. 5.
Figure 9:
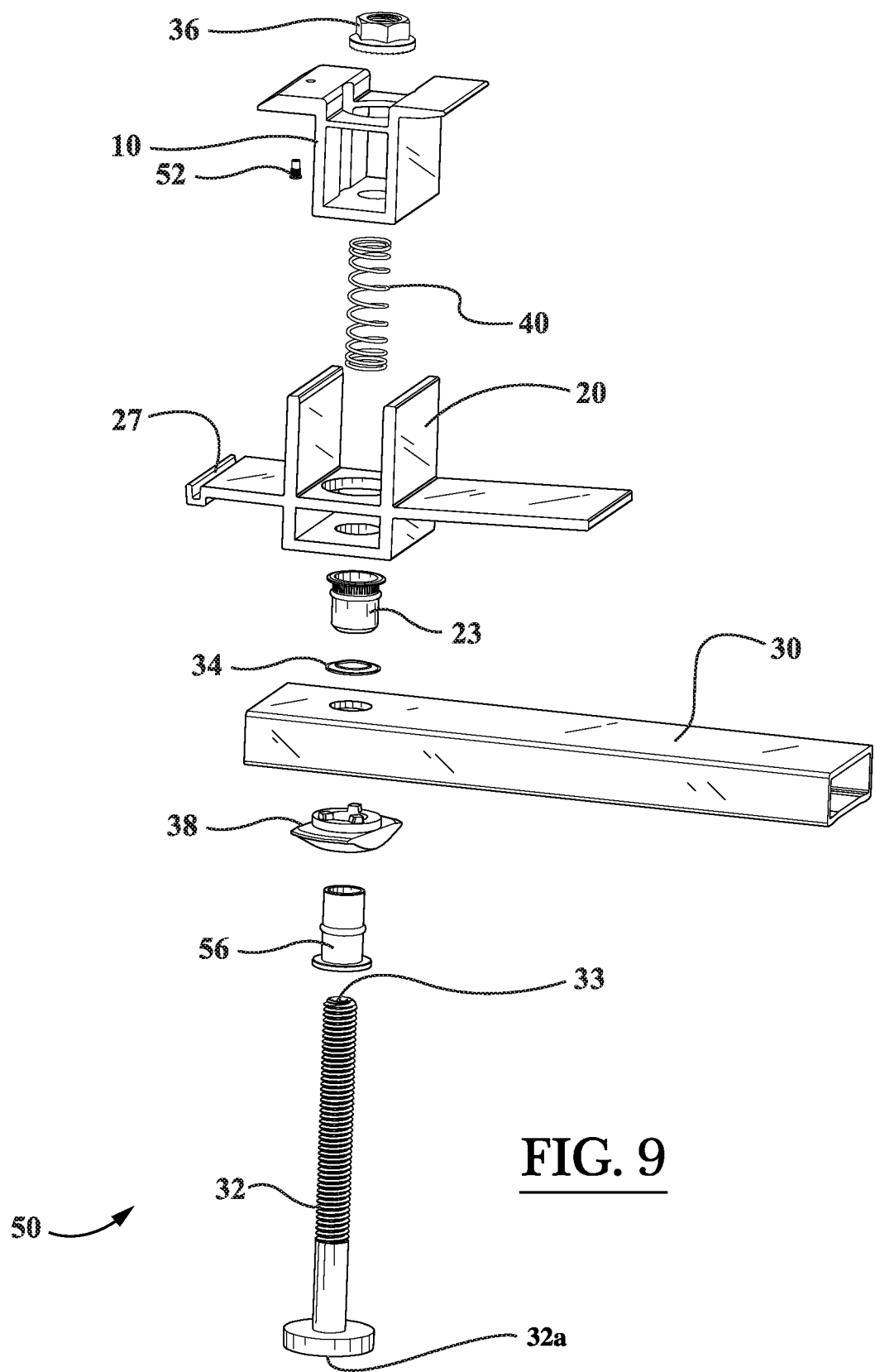
FIG. 9 is an exploded perspective view of the clamp assembly of FIG. 5.

Next, with particular reference to FIGS. 5-7 and 9, it can be seen that the illustrative clamp assembly 50 of the support surface attachment device 100 generally comprises an upper clamp member 10, a lower clamp member 20, and an upper tubular support member 30 (which operates as a handle or arm for engaging the clamp assembly 50 with the lower support member 42). As shown in FIGS. 5-7 and 9, the upper clamp member 10 is connected to the lower clamp member 20 and to the upper tubular support member 30 by a threaded fastening device 32 (e.g., a bolt 32 with external threads disposed on the shaft thereof). Specifically, the shaft of the bolt 32 passes through respective apertures in each of the components 10, 20, and 30, and the bolt 32 is secured in place with a nut 36 at the upper end thereof. Referring to the exploded view of FIG. 9, it can be seen that the bolt 32 passes through the locking cap member 38 beneath the tubular support member 30, and then through the lock rivet member 56 as the bolt 32 passes through tubular support member 30. On the top surface of the tubular support member 30, it can be seen that a lower push nut 34 circumscribes the bolt 32. As it proceeds upwardly through the clamp assembly 50, the bolt 32 then passes through a rivet nut 23 disposed in the bottom of the lower clamp member 20, and then through an aperture in the bottom of the upper clamp member 10 until it reaches the upper nut 36. As best illustrated in FIGS. 5, 6, and 9, the upper and lower clamp members 10, 20 are spring-biased by spring member 40. The spring member 40 is compressed between the bottom surface of the upper clamp member 10 and the upper rim of the rivet nut 23, which is disposed in the aperture 21 in the base portion 22 of the lower clamp member 20 (see FIG. 10).

Figure 8:
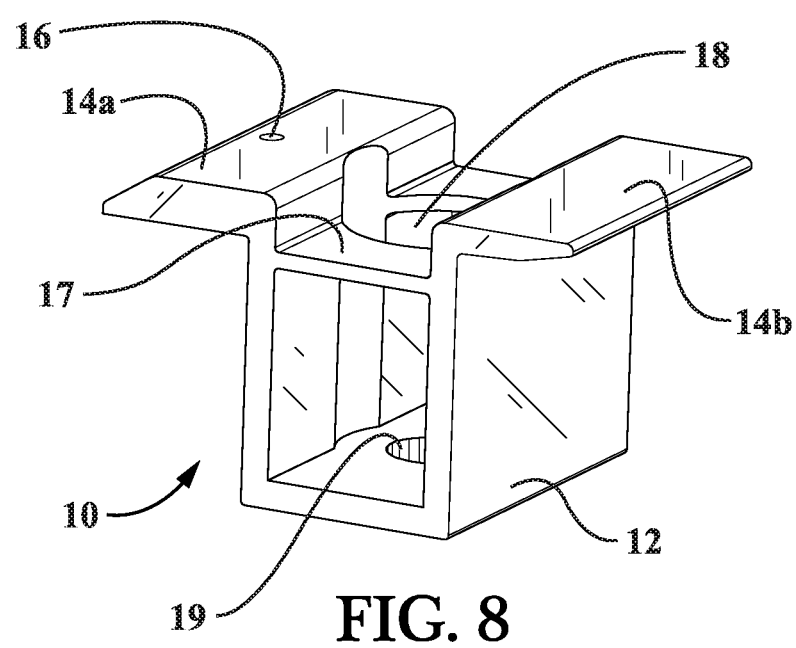
FIG. 8 is a perspective view of an upper clamp member of the clamp assembly of FIG. 5.

An illustrative upper clamp member 10 of the clamp assembly 50 is depicted in FIG. 8. As shown in this figure, the upper clamp member 10 generally includes a base portion 12, first and second opposed flange portions 14*a*, 14*b*, and an upper ledge portion 17 that is disposed between, and is slightly recessed below, the opposed flange portions 14*a*, 14*b*. The base portion 12 of the upper clamp member 10 is provided with a fastener aperture 19 for receiving the bolt 32, while the upper ledge portion 17 of the upper clamp member 10 is provided with a tool aperture 18 for accommodating the passage of a tool for tightening the nut 36 on the end of the bolt 32 (e.g., a socket wrench for tightening the nut 36). Also, as shown in FIG. 8, the first opposed flange portion 14*a* is provided with a set screw/set pin aperture 16 for accommodating a set screw/set pin 52 that engages the top surface of the lower skirt member 106. The vertical walls of the upper clamp member 10 that extend upwardly from the base portion 12 generally align with vertical walls of lower clamp member 20 illustrated in FIG. 10.

Figure 10:
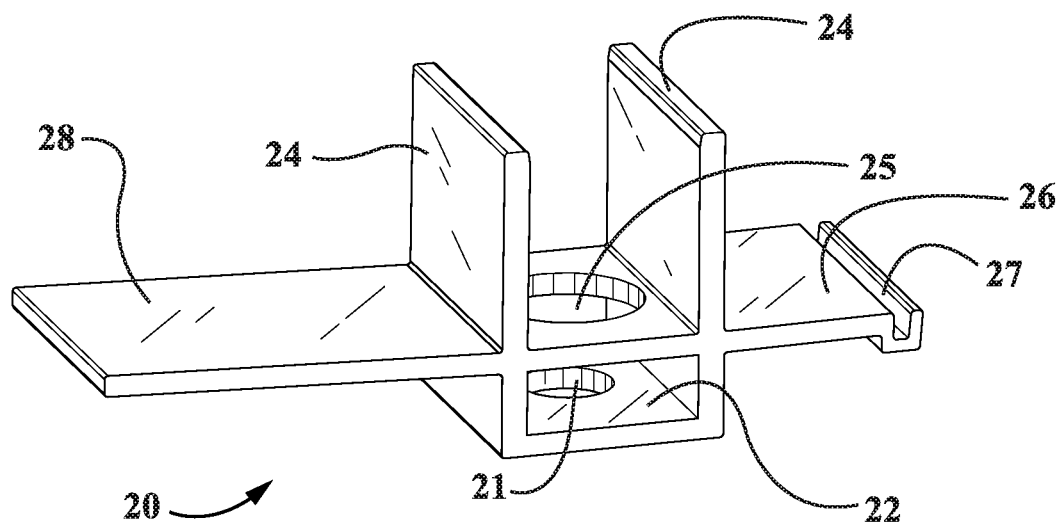
FIG. 10 is a perspective view of a lower clamp member of the clamp assembly of FIG. 5.
Figure 19:
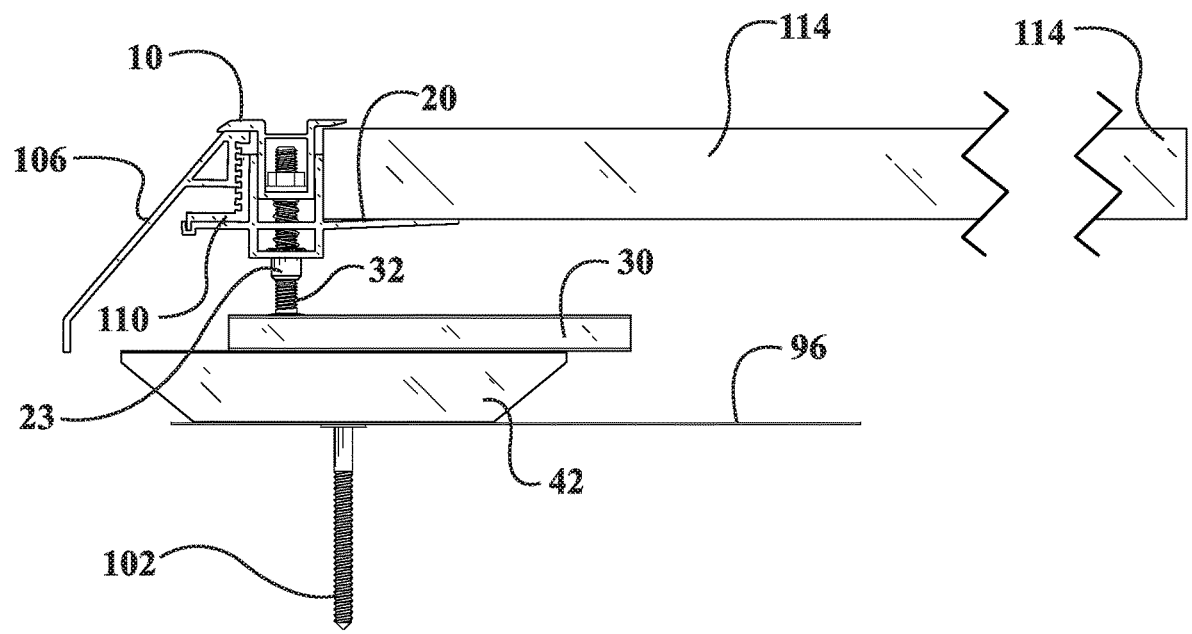
FIG. 19 is a side view of the support surface attachment device of FIGS. 3 and 4, wherein the support surface attachment device is shown illustrated with a lower skirt member and a photovoltaic module attached thereto.

An illustrative lower clamp member 20 of the clamp assembly 50 is depicted in FIG. 10. As shown in this figure, the lower clamp member 20 generally includes a base portion 22, opposed wall portions 24 with a middle ledge or shelf portion disposed therebetween, and opposed ledges or wings 26, 28 extending outwardly from the outer sides of the walls 24. The base portion 22 of the lower clamp member 20 is provided with an aperture 21 disposed therein for receiving the rivet nut 23, while the middle ledge or shelf portion of the lower clamp member 20 is provided with an aperture 25 for accommodating the passage of the bolt 32 therethrough. Also, as shown in FIG. 10, the first opposed ledge or wing 26 is provided with a groove 27 formed therein for receiving the downturned bottom edge of the skirt mounting bracket 110 (see FIG. 19). The spaced-apart vertical walls 24 of the lower clamp member 20 that extend upwardly from the base portion 22 generally align with vertical walls of upper clamp member 10 illustrated in FIG. 8. The rivet nut 23 that is received within the aperture 21 in the base portion 22 comprises internal threads for engaging the external threads of the bolt 32 that compresses the clamp assembly 50. As shown in FIG. 19, the PV modules 114 rest on one or both of the generally horizontal ledges or wings 26, 28. The vertical walls 24 keep the upper clamp member 10 in alignment (see FIG. 6), even when the same clamp is used as an end clamp.

With reference to FIGS. 5, 6, and 10, it can be seen that the second opposed ledge or wing 28 is bent slightly upward or is tapered slightly upward at an acute angle $\theta_1$ (see FIG. 6). In the installed state (as illustrated in FIG. 25), the upwardly tapered ledge 28 of the lower clamp member 20 extends uphill and slightly up and away from the building roof 98 so as to act as a leaf spring that takes up the difference in gap between the uphill clamp opening and the PV module 114 thickness, thereby preventing the PV module 114 from rattling and allowing it to be secured into place. In some embodiments, this also creates enough pressure on the upper clamp lip (i.e., second opposed flange portion 14*b* of upper clamp member 10) to enable a bonding point to function. The second opposed ledge or wing 88 of the lower coupling member 80, which will be described in detail hereinafter, is also provided with a similar slight upward taper at an acute angle $\theta_2$ (see FIG. 14) to also act as a leaf spring that takes up the difference in gap between the uphill clamp opening and the PV module 114 thickness, thereby preventing the PV module 114 from rattling and allowing it to be secured into place. Advantageously, because the second opposed ledge or wing 28 (i.e., flange 28) of the lower clamp member 20 and second opposed ledge or wing 88 (i.e., flange 88) of the lower coupling member 80 are both provided with slight upward tapers (i.e., bowed upwardly), the lower clamp member 20 and lower coupling member 80 apply a compressive force against the PV module 114 when it is installed therein. During the installation of each PV module 114, the PV module 114 is initially disposed at an upward acute angle relative to its one or more southern clamp assemblies 50 and coupling assemblies 60. Then, each PV module 114 is rotated down until it is generally parallel with the roof surface. As each PV module 114 is rotated downwardly towards the roof surface, the edge portion of the uphill PV module 114 presses down on the upwardly tapered ledge(s) 28 of the lower clamp member(s) 20 and the upwardly tapered ledge(s) 88 of the lower coupling member(s) 80, so as to apply a downward force on the upwardly tapered ledges 28 and 88, thereby ensuring that the PV module 114 is securely engaged with the lower clamp member(s) 20 and lower coupling member(s) 80 and the PV module 114 is tightly held in place. In response to the downward force applied by the PV module 114, the upwardly tapered ledges 28 and 88 elastically deform or yield in a spring-like manner. As a result of the leaf spring design of the upwardly tapered ledges 28 and 88, the installer is not required to reach down over the PV module 114 to tighten the nuts 36 on its one or more southern clamp assemblies 50, or to tighten the bolts 90 on its one or more southern coupling assemblies 60. An attempt by the installer to tighten the nuts 36 on the one or more southern clamp assemblies 50, or to tighten the bolts 90 on the one or more southern coupling assemblies 60, would not be safe, ergonomic, or efficient.

Advantageously, the adjustable clamp assembly 50 that includes the upper and lower clamp members 10, 20 allows the module support surface attachment device 100 to be attached to any photovoltaic module or panel 114 of any thickness without requiring a custom profile. The adjustable clamp assembly 50 operates as a compression clamp, and may be attached anywhere along any one of the four (4) peripheral edges of the PV modules 114. The universal clamp design of the adjustable clamping assembly 50 advantageously eliminates the need for separate mid and end clamps.

Figure 45:
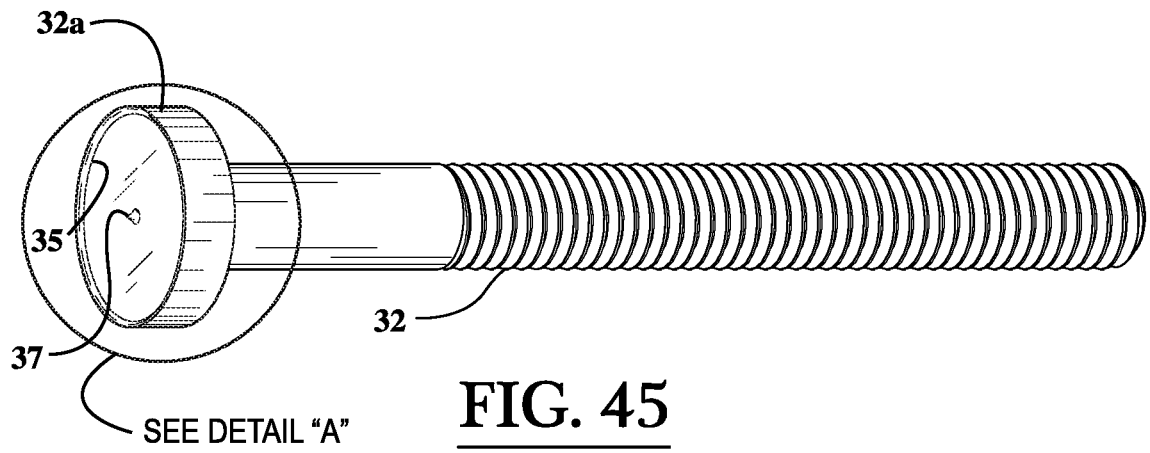
FIG. 45 is a perspective view of the threaded fastener member of the clamp assembly of FIG. 9.
Figure 46:
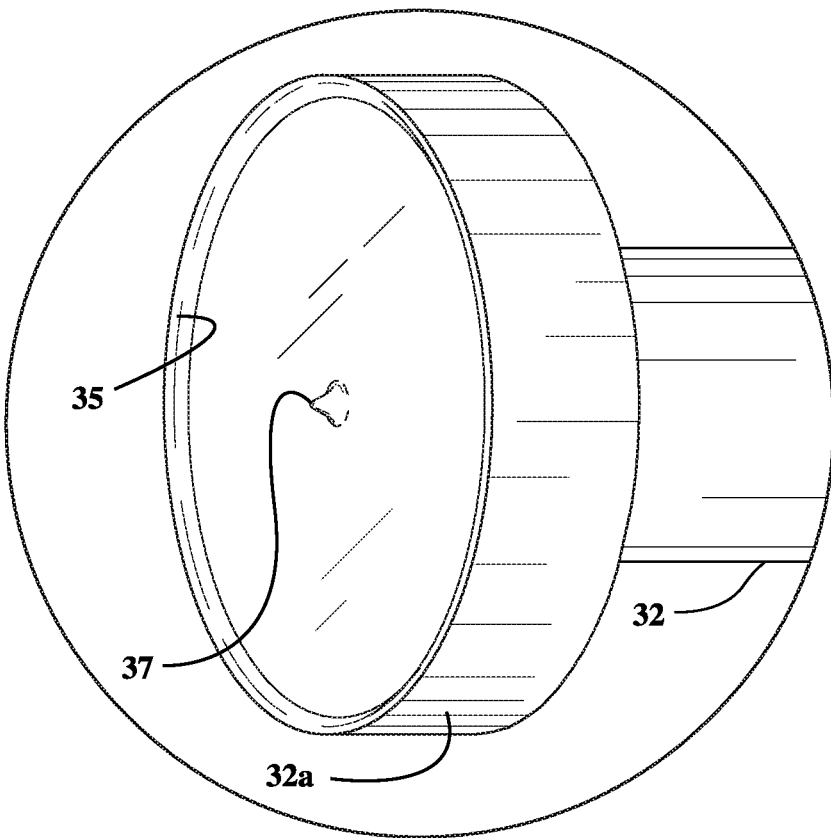
FIG. 46 is a partial, enlarged perspective view of the head of the threaded fastener member of FIG. 45 (Detail "A").

In the illustrated embodiment, the threaded fastening device 32 (e.g., a bolt 32) is capable of serving two important distinct functions related to the support surface attachment device 100. First, the threaded fastening device 32, together with the nut 36 and the rivet nut 23, secures the upper and lower clamp members 10, 20 in an engaged relationship with one or more PV modules 114 (e.g., as shown in FIG. 19). Secondly, the same threaded fastening device 32 also enables the height of the one or more PV modules 114 that are securely held in a clamped fashion by the support surface attachment device 100 to be adjusted relative to the support surface (i.e., the roof 98). In particular, the innovative design of the components of clamp assembly 50 make this dual functionality of the threaded fastening device 32 possible. In particular, in order to prevent the undesirable rotation of the threaded fastening device 32 when the nut 36 is tightened during PV module securement, the bottom surface of the head 32a of the threaded fastening device 32 is provided with an outer circumferential projection 35 and a central projection 37 (see FIGS. 45 and 46) that engage with the upper surface of the bottom wall 43 of the groove 48 in the lower support member 42 in an interference fit. As such, the bottom surface of the head 32a of the threaded fastening device 32 torsionally interferes or "bites" into the upper surface of the bottom wall 43 of the groove 48 so as to prevent the rotation of the threaded fastening device 32 when the nut 36 is being torqued. In addition, the interference between the bottom surface of the head 32a of the threaded fastening device 32 and the upper surface of the bottom wall 43 of the groove 48 of the lower support member 42 maintains the grounding current path of the support surface attachment device 100. Conversely, in order to prevent the undesirable rotation of the nut 36 when the height of the one or more PV modules 114 are being adjusted by rotating the threaded fastening device 32, the nut 36 is designed to engage with a sufficient frictional force against the top surface of the base portion 12 of the upper clamp member 10. Also, the rivet nut 23 is fixed in place relative to the lower clamp member 20 such that it does not rotate during the torqueing of the threaded fastening device 32. In one exemplary embodiment, the nut 36 is provided with a lower flange having a one-way serration pattern disposed on the bottom thereof that frictionally interferes or "bites" into the top surface of the base portion 12 of the upper clamp member 10. Thus, when the threaded fastening device 32 is rotated in either a clockwise direction or a counter-clockwise direction (e.g., by engaging a drill or wrench with the hexagonal recess 33 disposed in the top thereof—FIGS. 5 and 9), the height of the one or more PV modules 114 are capable of being adjusted without the loosening the clamp members 10, 20. During height adjustment, the torque to turn the threaded fastening device 32 has to be greater than the torque caused by the tightening of the nut 36 so as to overcome the frictional engagement between the head 32a of the threaded fastening device 32 and the bottom wall 43 of the groove 48 of the lower support member 42. In addition, during height adjustment and after the nut 36 has secured the clamp in place, the requisite torque to turn the threaded fastening device 32 by overcoming the thread resistance and the frictional resistance between the head 32a and the lower support member 42 has to be less than the torsional strength of the threaded fastening device 32 (i.e., to avoid shearing the shaft of the threaded fastening device 32), and it has to be less than the torsional strength of the drill bit or other type of tool that is used to rotate the threaded fastening device 32). During the securement of the upper and lower clamp members 10, 20, the torque required to tighten the nut 36 must be less than the resistance torque resulting from the frictional engagement between the head 32a and the lower support member 42.

Figure 11:
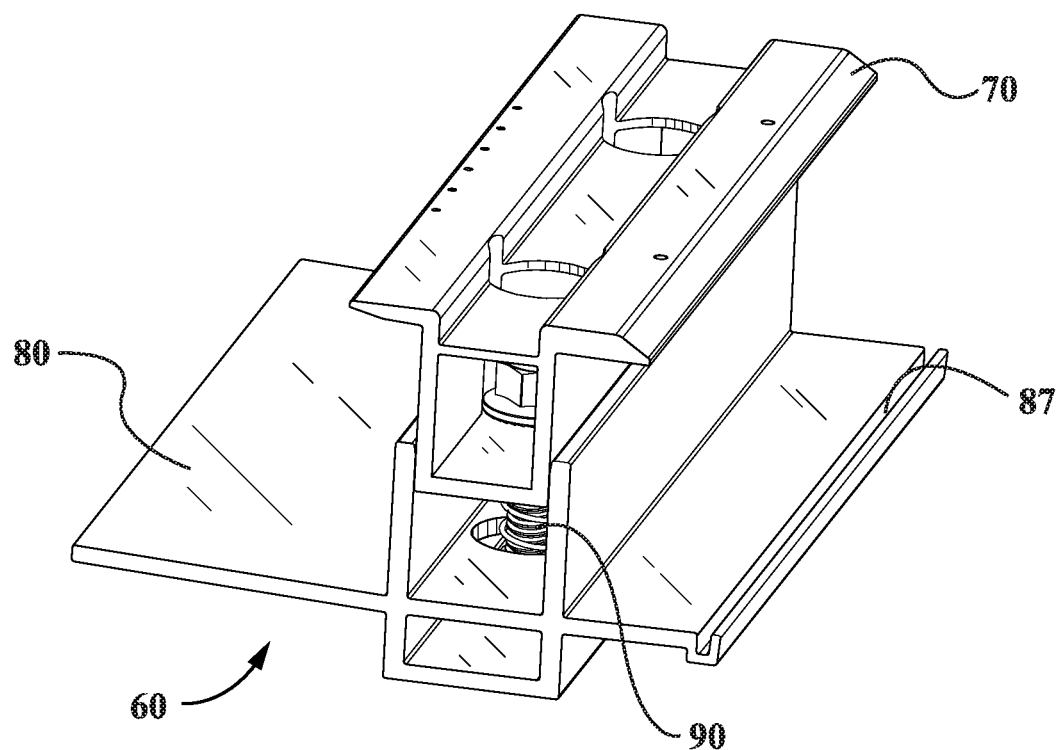
FIG. 11 is an end perspective view of a coupling device of the mounting system, according to the illustrative embodiment of the invention.
Figure 12:
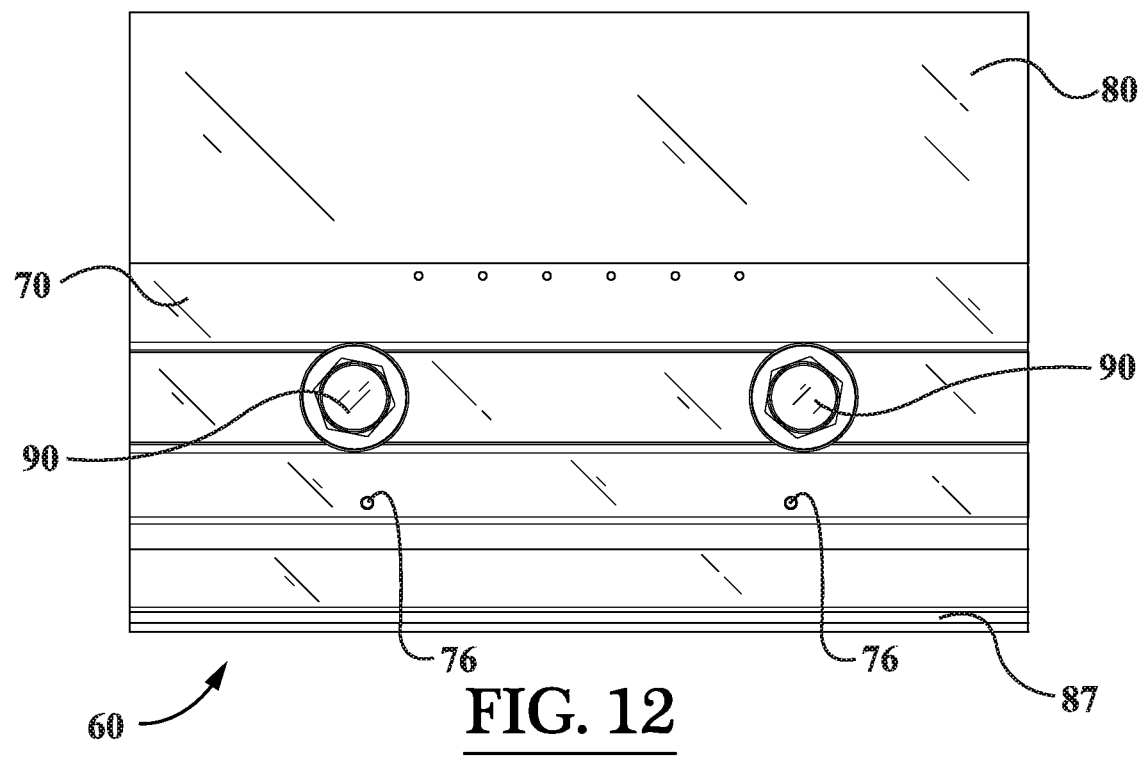
FIG. 12 is a top view of the coupling device of FIG. 11.
Figure 13:
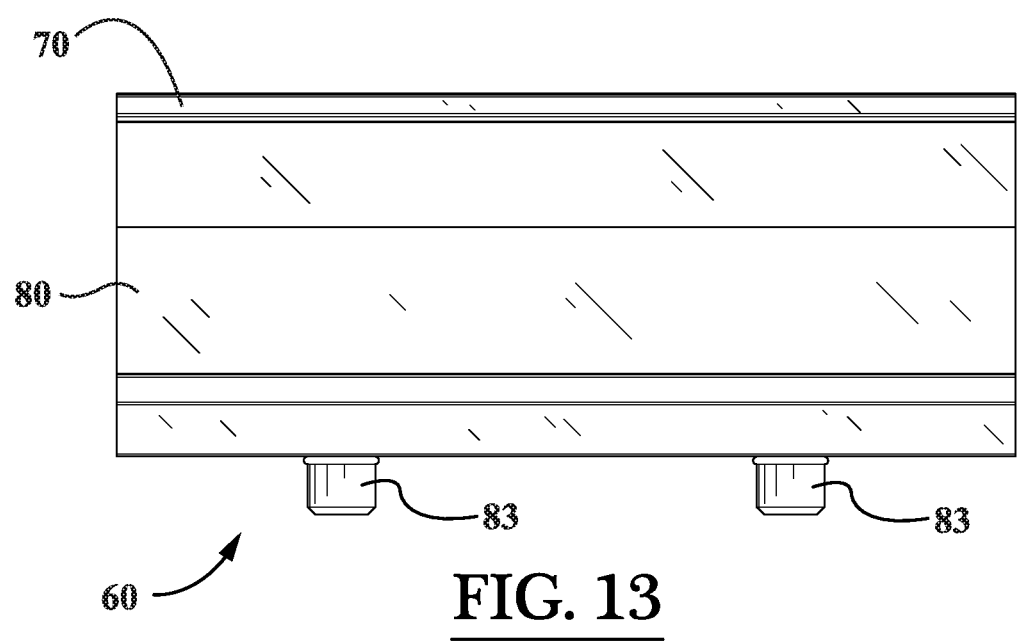
FIG. 13 is a side view of the coupling device of FIG. 11.
Figure 14:
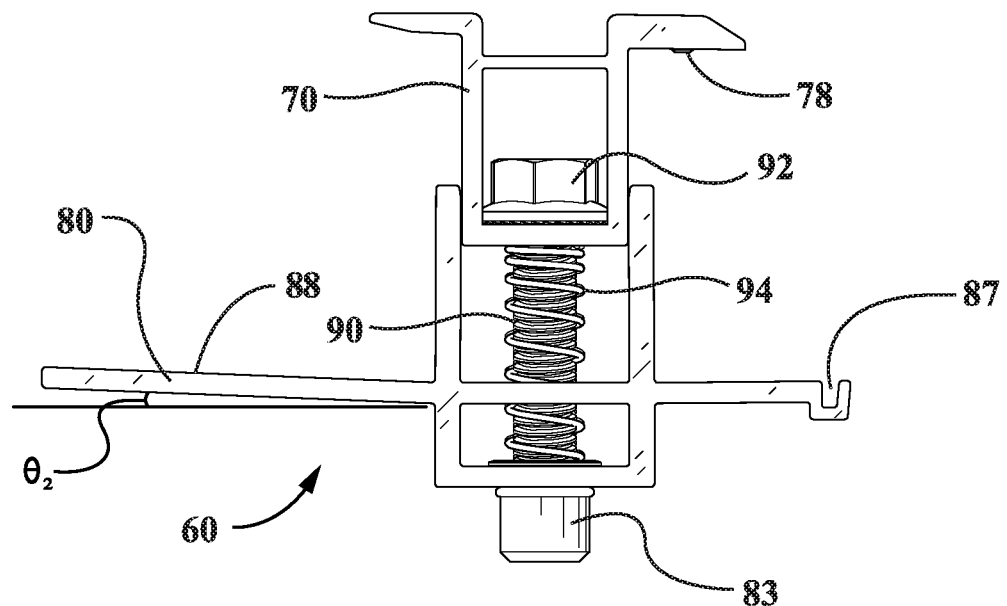
FIG. 14 is an end view of the coupling device of FIG. 11.

Now, turning to FIGS. 11-16 and 18, the components of the coupling devices 60 of the PV module mounting system illustrated in FIG. 25 will be described. Initially, referring to FIGS. 11, 14, and 18, it can be seen that the illustrative coupling device 60 of the photovoltaic mounting system generally comprises an upper coupling member 70 and a lower coupling member 80. As shown in FIGS. 11 and 14, the upper coupling member 70 is connected to the lower coupling member 80 by a plurality of threaded fastening devices 90 (e.g., two (2) spaced-apart bolts 90 with external threads disposed on the shafts thereof). Specifically, the shafts of the bolts 90 pass through respective apertures in each of the components 70, 80, and the bolts 90 are secured in place with respective rivet nuts 83 at the lower ends thereof (e.g., see FIG. 14). Referring to the end view of FIG. 14 and the exploded view of FIG. 18, it can be seen that the bolts 90 pass through respective apertures 71 in base portion 72 of the upper coupling member 70, and then through respective apertures 85 in the middle ledge or shelf portion of the lower coupling member 80. The heads 92 of the bolts 90 both rest on the top surface of the base portion 72 of the upper coupling member 70, while the lower, opposite ends of the bolts 92 are threadingly received by respective rivet nuts 83. As best illustrated in FIGS. 11 and 14, the upper and lower coupling members 70, 80 are spring-biased by spring members 94. The spring members 94 are compressed between the bottom surface of the upper coupling member 70 and the upper rims of respective rivet nuts 83, which are disposed in respective apertures in the base portion 82 of the lower coupling member 80.

Figure 15:
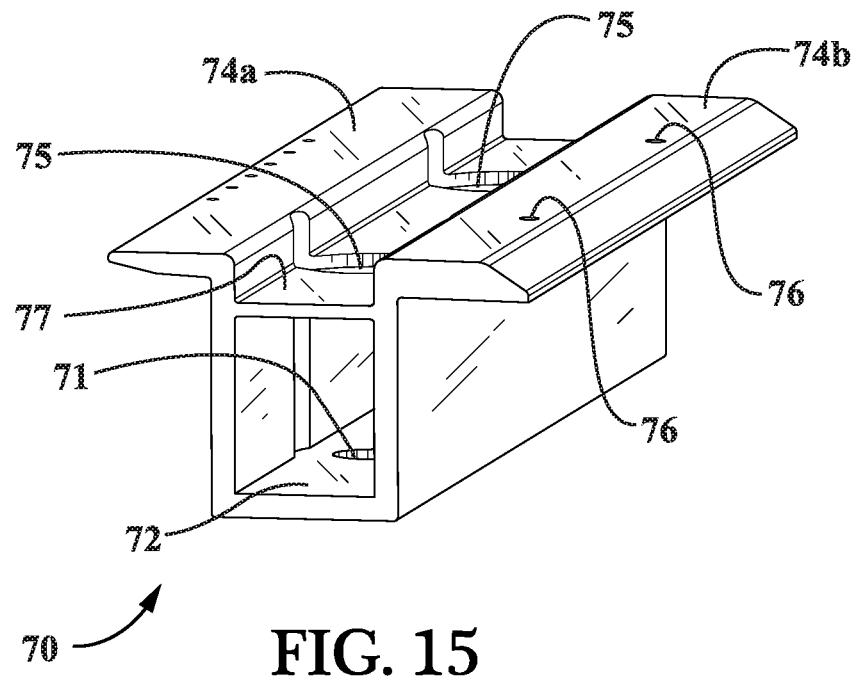
FIG. 15 is a perspective view of an upper coupling member of the coupling device of FIG. 11.

An illustrative upper coupling member 70 of the coupling device 60 is depicted in FIG. 15. As shown in this figure, the upper coupling member 70 generally includes a base portion 72, first and second opposed flange portions 74a, 74b, and an upper ledge portion 77 that is disposed between, and is slightly recessed below, the opposed flange portions 74a, 74b. The base portion 72 of the upper coupling member 70 is provided with spaced-apart fastener apertures 71 for receiving the bolts 90, while the upper ledge portion 77 of the upper coupling member 70 is provided with tool apertures 75 for accommodating the passage of a tool for tightening the heads 92 of the bolts 90 on the end of the bolts 90 (e.g., a socket wrench for tightening the bolts 90). Also, as shown in FIG. 15, the second opposed flange portion 74b is provided with a set screw/set pin aperture 76 for accommodating a set screw/set pin 78 that engages the top surface of the lower skirt member 106 or an upper skirt member. The spaced-apart vertical walls of the upper coupling member 70 that extend upwardly from the base portion 72 generally align with the vertical walls of lower clamp member 80 illustrated in FIG. 16. One or both of the opposed flange portions 74a, 74b of the upper coupling member 70 may be provided with a coin/catch that allows the user (i.e., the installer) to slide the coupling device 60 onto the PV module 114 without the coupling device 60 slipping off of the PV module 114 prior to it being torqued.

Figure 16:
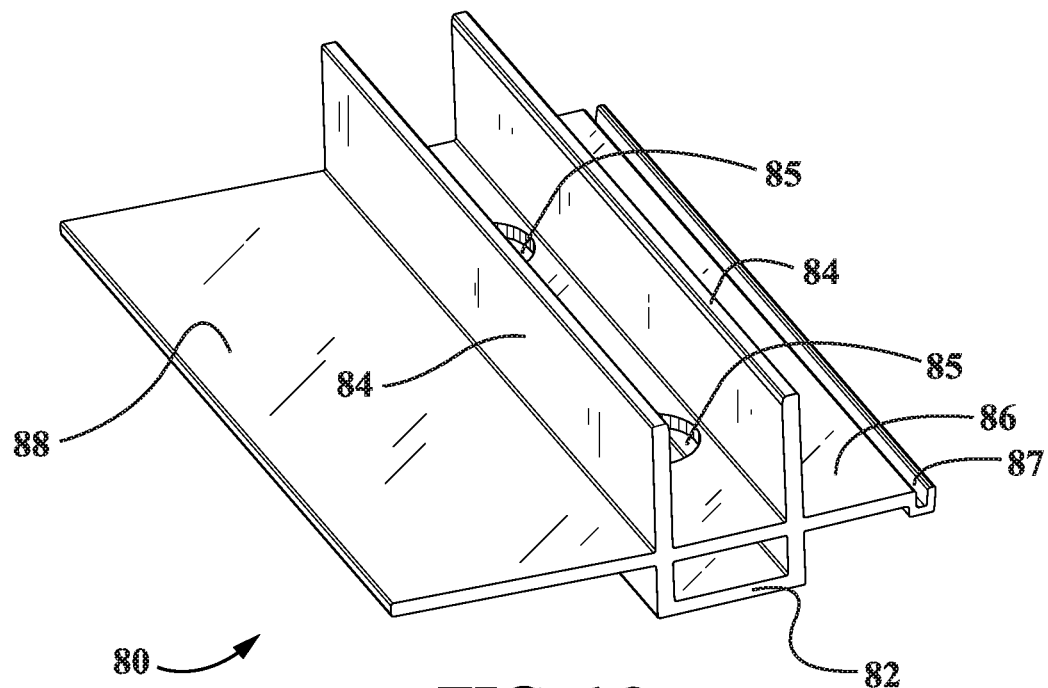
FIG. 16 is a perspective view of a lower coupling member of the coupling device of FIG. 11.

An illustrative lower coupling member 80 of the coupling device 60 is depicted in FIG. 16. As shown in this figure, the lower coupling member 80 generally includes a base portion 82, opposed wall portions 84 with a middle ledge or shelf portion disposed therebetween, and opposed ledges or wings 86, 88 extending outwardly from the outer sides of the walls 84. The base portion 82 of the lower coupling member 80 is provided with longitudinally spaced-apart apertures for receiving respective rivet nuts 83, while the middle ledge or shelf portion of the lower coupling member 80 is provided with longitudinally spaced-apart apertures 85 for accommodating the passage of respective bolts 90 therethrough. Also, as shown in FIG. 16, the first opposed ledge or wing 86 is provided with a groove 87 formed therein for receiving the downturned bottom edge of the skirt mounting bracket 110. The spaced-apart vertical walls 84 of the lower coupling member 80 that extend upwardly from the base portion 82 generally align with the vertical walls of upper coupling member 70 illustrated in FIG. 15. The rivet nuts 83 that are received within respective apertures in the base portion 82 of the lower coupling member 80 each comprise internal threads for engaging the external threads of respective bolts 90 that compress the coupling device 60. Similar to the clamp assembly 50 shown in FIG. 19, the PV modules 114 rest on one or both of the generally horizontal ledges or wings 86, 88 of the lower coupling member 80. The vertical walls 84 keep the upper coupling member 70 in alignment (see FIG. 14) even when the coupling device 60 is used to couple the end portions of adjacent PV modules 114 in the same row.

Advantageously, the adjustable coupling device 60, which includes the upper and lower coupling members 70, 80, may be attached to any photovoltaic module or panel 114 of any thickness without requiring a custom profile. In other words, the coupling device 60 easily couples a plurality of off-the-shelf PV modules 114 without the need for a special custom profile. Like the clamp assembly 50, the adjustable coupling device 60 operates as a compression clamp, and may be attached anywhere along any one of the four (4) peripheral edges of the PV modules 114. The universal clamp design of the adjustable coupling device 60 advantageously eliminates the need for separate mid and end clamps.

In one exemplary embodiment, the upper and lower coupling members 70, 80 may be formed from aluminum, and the threaded fastening devices 90 (e.g., bolts) may be formed from stainless steel. Also, in one or more embodiments, the upper and lower coupling members 70, 80 may be combined with the threaded fastening device 32 and the upper support member 30 of the support surface attachment device 100 by first removing the upper and lower clamp members 10, 20 therefrom, and then attaching the upper and lower coupling members 70, 80 to the threaded fastening device 32. This combined assembly is particularly useful when the location of a clamp assembly 50 of the support surface attachment device 100 conflicts with the location of a coupling assembly 60 in photovoltaic array installation.

Now, turning to FIGS. 19-25, a skirt member 106 of the photovoltaic mounting system will be described. Initially, referring to FIG. 25, it can be seen that the skirt member 106 is located on the southernmost edge of the array of PV modules 114. The skirt member 106 is supported by the spaced-apart support surface attachment devices 100. In particular, as shown in FIGS. 19 and 20, the skirt member 106 and its associated mounting bracket 110 is sandwiched between the upper clamp member 10 and the lower clamp member 20 of the clamp assembly 50 of the support surface attachment device 100. In other words, the skirt member 106 and its associated mounting bracket 110 are clampingly engaged by the upper clamp member 10 and the lower clamp member 20. Also, as explained above, the downturned edge of the skirt mounting bracket 110 is received within the groove 27 that is formed within the first opposed ledge or wing 26 of the lower clamp member 20.

Figure 21:
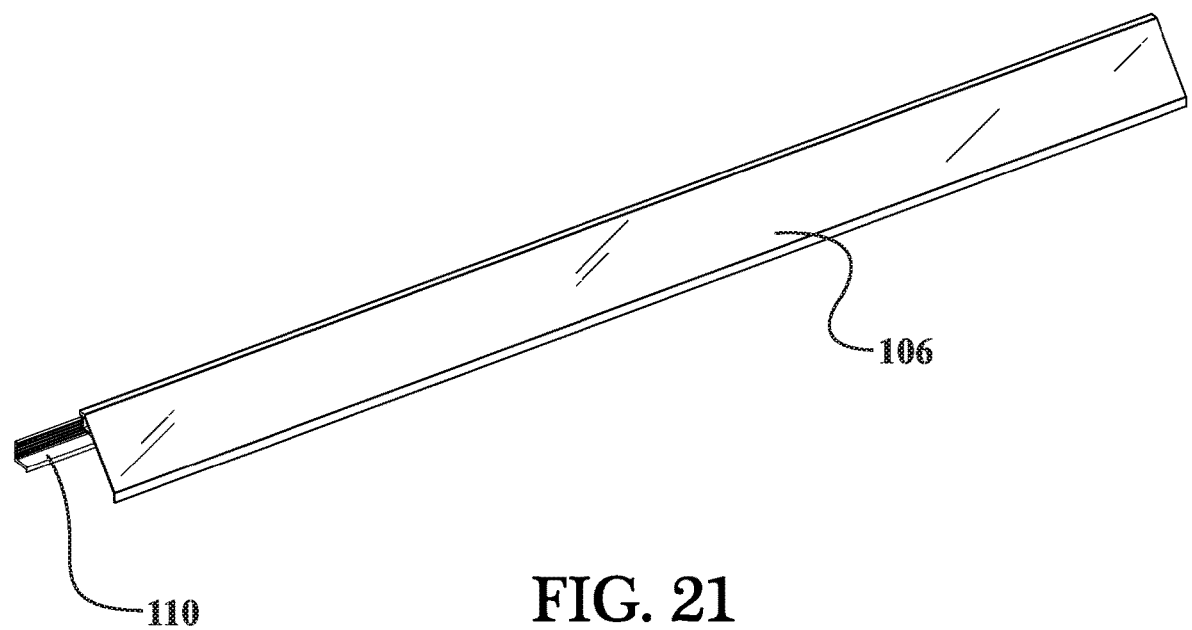
FIG. 21 is a perspective view of the lower skirt member and skirt mounting bracket of FIG. 20.
Figure 22:
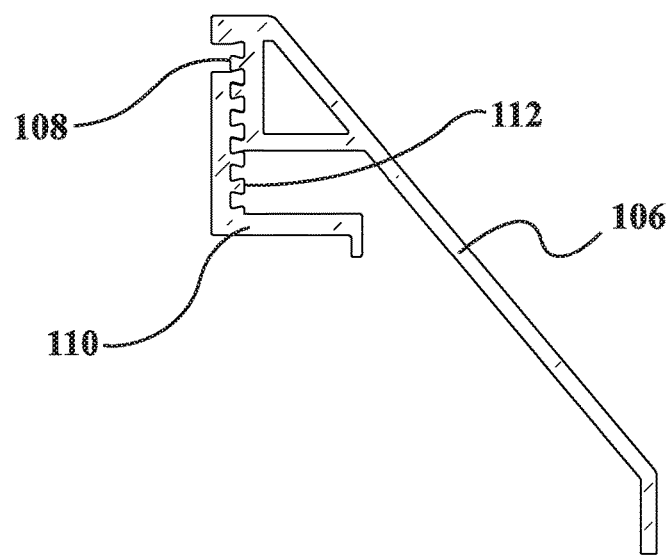
FIG. 22 is an end view of the lower skirt member and skirt mounting bracket of FIG. 21.
Figure 23:
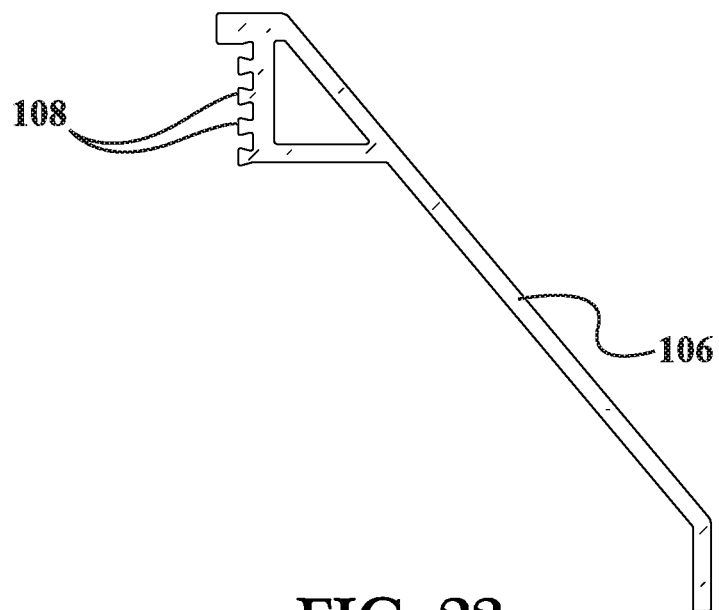
FIG. 23 is an end view of the lower skirt member of FIG. 21.
Figure 24:
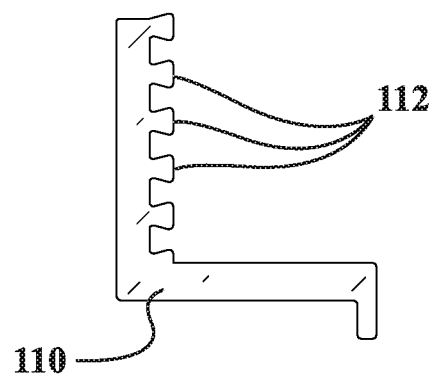
FIG. 24 is an end view of the skirt mounting bracket of FIG. 21.

Next, referring to FIGS. 21-24, the engagement between the skirt member 106 and the skirt mounting bracket 110 will be explained. As shown in FIG. 23, a backside of the diagonal skirt member 106 comprises a plurality of teeth-like projections or protrusions 108. Similarly, as best depicted in FIG. 24, the front side of the skirt mounting bracket 110 comprises a plurality of teeth-like projections or protrusions 112. With reference to FIGS. 21 and 22, it can be seen that at least some of the teeth-like projections or protrusions 108 of the diagonal skirt member 106 matingly engage with at least some of the teeth-like projections or protrusions 112 on the skirt mounting bracket 110. This engagement between the teeth-like projections 108, 112 enables the skirt mounting bracket 110 to support the skirt member 106 on the clamp assembly 50. Advantageously, the teeth-like projections or protrusions 108, 112 on the skirt member 106 and the skirt mounting bracket 110, respectively, allows the skirt member 106 to be mounted at various heights relative to the skirt mounting bracket 110 so that the skirt assembly 106, 110 is capable of matching the height of any PV module 114. This is important because then the skirt assembly 106, 110 sets the gap size of the clamp assembly 50 and the coupling assembly 60 on the south row of the PV array to accept the first row of PV modules 114.

As shown in FIG. 25, the skirt member 106 covers the exposed downhill edge of the array of PV modules 114 (only one skirt member 106 is shown in FIG. 25). Because the skirt member(s) 106 closes out the south row of PV modules 114, it improves the aesthetics of the completed photovoltaic array. No clamps or hardware is seen from ground. Airflow around the array is permitted. In one exemplary embodiment, the skirt member 106 may be formed from aluminum. In another exemplary embodiment, the skirt member 106 may be formed from a suitable polymer.

Figure 26:
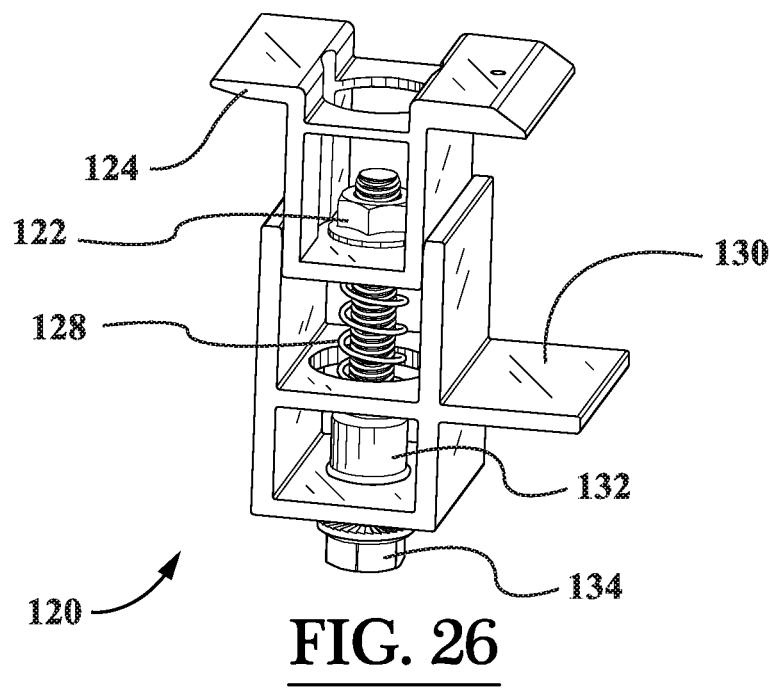
FIG. 26 is a side perspective view of a bracket assembly of the mounting system, according to the illustrative embodiment of the invention.
Figure 27:
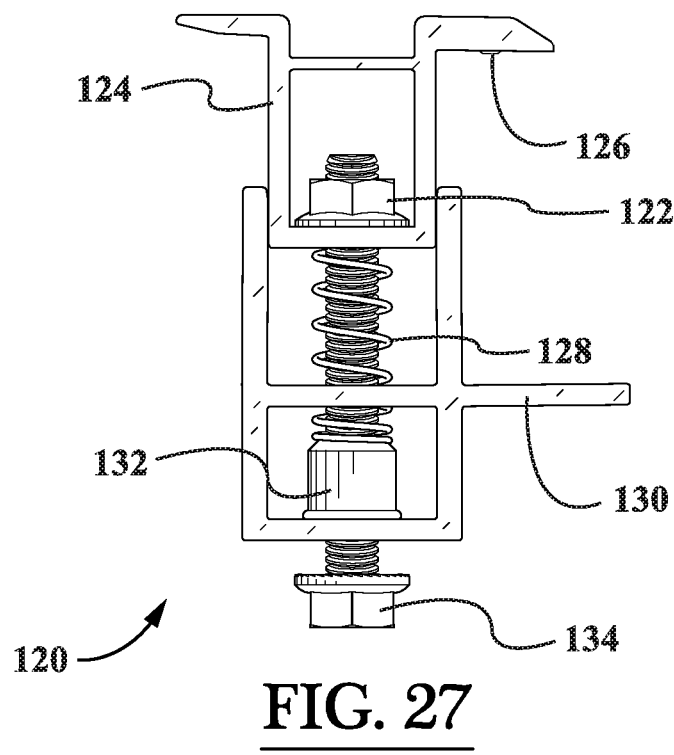
FIG. 27 is a side view of the bracket assembly of FIG. 26.

Referring to FIGS. 26 and 27, an illustrative bracket assembly 120 of the photovoltaic mounting system will be described. As explained above, one or more bracket assemblies 120 may be used for securing one or more respective electrical assemblies (e.g., one or more micro-inverters) to the underside of one or more PV modules 114. As shown in FIGS. 26 and 27, the bracket assembly 120 generally comprises an upper bracket member 124 that is connected to a lower bracket member 130 by means of a threaded fastening device 134 (e.g., a bolt 134 with external threads disposed on the shaft thereof). Specifically, the shaft of the bolt 134 passes through respective apertures in each of the components 124, 130, and the bolt 134 is secured in place with a nut 122 at the upper end thereof. Referring to FIGS. 26 and 27, it can be seen that the bolt 134 passes through a rivet nut 132 disposed in the bottom of the lower bracket member 130, then through an aperture located in the ledge or shelf portion of the lower bracket member 130, and finally through an aperture in the bottom of the upper bracket member 124 until it reaches the upper nut 122. Also, as illustrated in FIGS. 26 and 27, the upper and lower bracket members 124, 130 are spring-biased by spring member 128. The spring member 128 is compressed between the bottom surface of the upper bracket member 124 and the upper rim of the rivet nut 132, which is disposed in the aperture in the base portion 22 of the lower bracket member 130. The bracket assembly 120 clamps to a PV module 114 by respectively engaging the opposed top and bottom surfaces of the PV module 114 with the flange portion of the upper bracket member 124 and the ledge or wing portion of the lower bracket member 130. As best shown in FIG. 27, one of the opposed flange portions of the upper bracket member 124 is provided with a set screw/set pin 126 for engaging the top surface of the PV module 114 to which it is attached. The electrical assembly (e.g., a micro-inverter) that is supported by the bracket assembly 120 typically comprises a notch that engages the bolt 134 near the head end thereof (e.g., in the gap between the bolt head and the bottom surface of the lower bracket member 130 in FIG. 27).

Next, a description of the manner in which the support surface attachment devices 100 of the mounting system are installed on a roof will be provided. Initially, referring to FIGS. 1-4, the lower support member 42 and flashing member 96 of each support surface attachment device 100 is secured to the building rooftop 98 using its respective structural mounting screw 102. Then, the clamp assemblies 50 are attached in a staged fashion to their respective lower support members 42. Initially, each clamp assembly 50 is installed in the 9 o'clock position on its respective lower support member 42 (see FIG. 1). Then, the upper tubular support member 30 of each clamp assembly 50, which operates as a handle, is turned approximately 90 degrees clockwise by a user thereof (i.e., a PV system installer) so that each clamp assembly 50 is locked in place relative to its respective lower support member 42. As the upper tubular support member 30 is turned by a user, the outer circumferential projection 35 and the central projection 37 of the head 32a of the threaded fastening device 32 "bite" into the lower support member 42 so as to prevent the clamp assembly 50 from turning while the upper tubular support member 30 is being rotated approximately 90 degrees. The interference engagement between the head 32a of the threaded fastening device 32 and the lower support member 42 also prevents the clamp assembly 50 from drifting from its intended fixation location as the upper tubular support member 30 is rotated approximately 90 degrees (i.e., it prevents north or south drifting of the clamp assembly 50). Once each clamp assembly 50 is locked in place, it is in a generally 12 o'clock position on its respective lower support member 42 (see FIG. 2). An approximate height of the PV modules 114 relative to the support surface (e.g., roof) may be achieved by rotating the subassembly comprising the upper clamp member 10, lower clamp member 20, and the rivet nut 23 relative to the upper tubular support member 30 of the support surface attachment device 100. Height adjustment of the PV modules 114 may be achieved by rotating the threaded fastening device 32 (e.g., by using the hexagonal recess 33 disposed therein—FIGS. 5 and 9) relative to the nut 36, upper clamp member 10, lower clamp member 20, rivet nut 23, and upper support member 30.

A second illustrative embodiment of a support surface attachment device is seen generally at 200 in FIGS. 28-33. Referring to these figures, it can be seen that, in some respects, the second illustrative embodiment is similar to that of the first embodiment of the support surface attachment device 100. Moreover, some elements are common to both such embodiments. For the sake of brevity, the elements that the second embodiment of the support surface attachment device has in common with the first embodiment will not be discussed in detail because these components have already been described above.

In the second illustrative embodiment, as shown in FIGS. 28-33, the support surface attachment device 200 generally comprises a disc member 236 configured to be attached to a support surface (e.g., the building rooftop 98 of FIG. 25), a clamp assembly 202, 208 configured to engage one or more PV modules 114, and a flashing member 254 for preventing leaks in the building roof 98. The disc member 236 is capable of being rotated about the structural mounting screw 232 so as to permit the clamp assembly 202, 208 to be flexibly positioned on the building roof 98. Because the clamp assembly 202, 208 can be positioned anywhere about the circumference of the disc member 236 by the rotation of the disc member 236 about the structural mounting screw 232, the necessary mounting location of the PV modules 114 can be easily accommodated after the disc member 236 and the flashing member 254 have been attached to a roof rafter 116 by the structural mounting screw 232. As such, it is not necessary for the base assembly of the support surface attachment device 200, which comprises the disc member 236 and the flashing member 254, to be precisely located along the length of the roof rafter 116 because the disc member 236 described herein advantageously affords generous adjustability in the south-north installation direction and/or east-west installation direction. Also, the support surface attachment devices 200 can also be flexibly located in the east-west direction on the building rooftop 98 such that they correspond with the spacing of the roof rafters 116 because the support surface attachment devices 200 can be mounted virtually anywhere along the length (i.e., east-west direction) of the PV modules 114.

Figure 34:
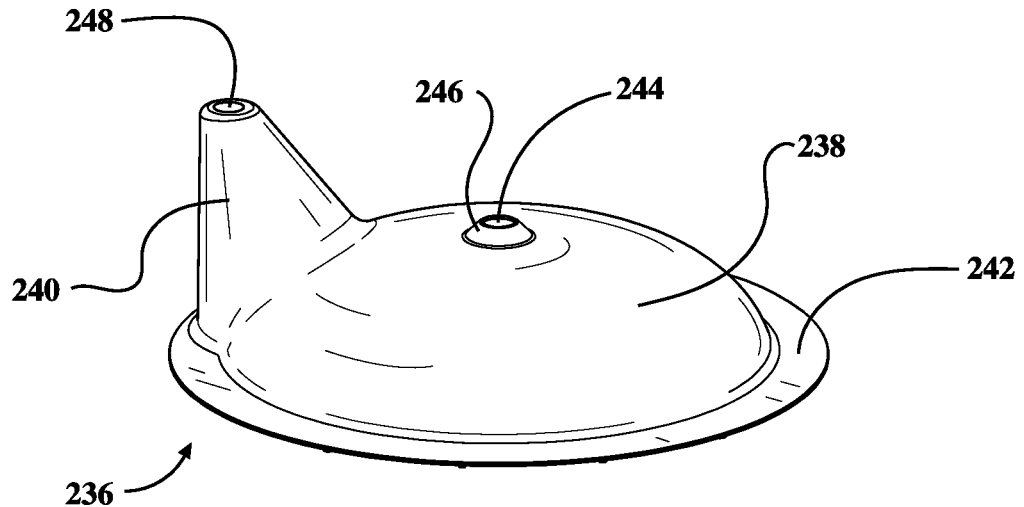
FIG. 34 is a perspective view of a disc member of the support surface attachment device of FIG. 28.
Figure 35:
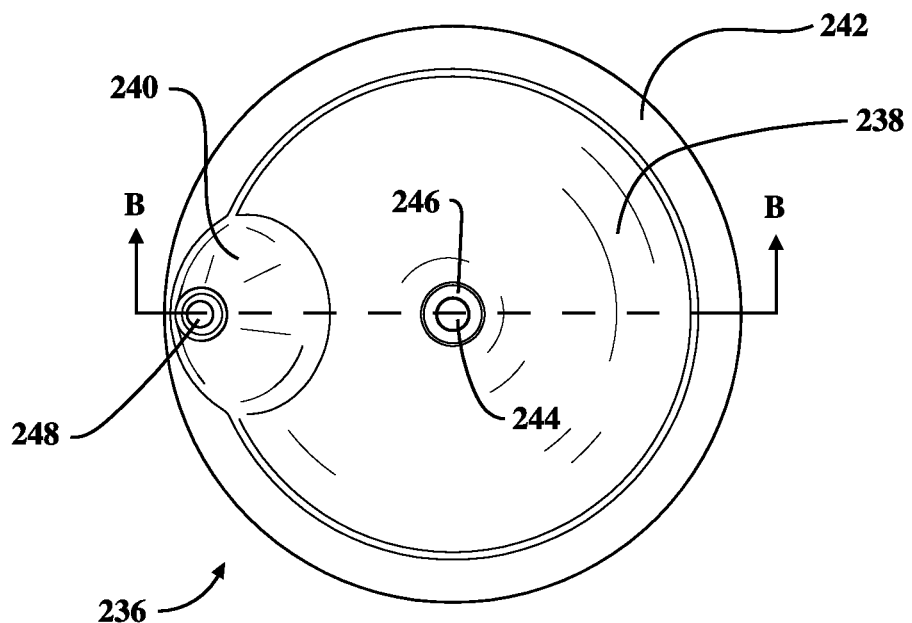
FIG. 35 is a top view of the disc member of FIG. 34.

Now, referring primarily to FIGS. 34-39, the disc member 236 of the support surface attachment device 200 will be described. As shown in these figures, the disc member 236 generally comprises a dome-shaped body portion 238 and a conical projection 240 that extends upwardly from the dome-shaped body portion 238 in a generally vertical direction. As best shown in FIGS. 34 and 35, the conical projection 240 is disposed proximate to an outer periphery of the dome-shaped body portion 238 of the disc member 236. The dome-shaped body portion 238 of the disc member 236 comprises a centrally disposed aperture 244 for receiving structural mounting screw 232. As mentioned above, during the installation of the support surface attachment device 200 on a roof, the disc member 236 is capable of being rotated about the structural mounting screw 232 so as to allow the flexible positioning of the clamp assembly 202, 208. In order to prevent precipitation (i.e., rain water) from entering the aperture 244, the central aperture 244 is surrounded by a conical wall 246. In FIGS. 28-32, it can be seen that, in an assembled state, a cone-shaped sealing washer 234 is sandwiched between the head of the structural mounting screw 232 and the conical wall 246 of the disc member 236 so as to further prevent precipitation from entering aperture 244.

Figure 36:
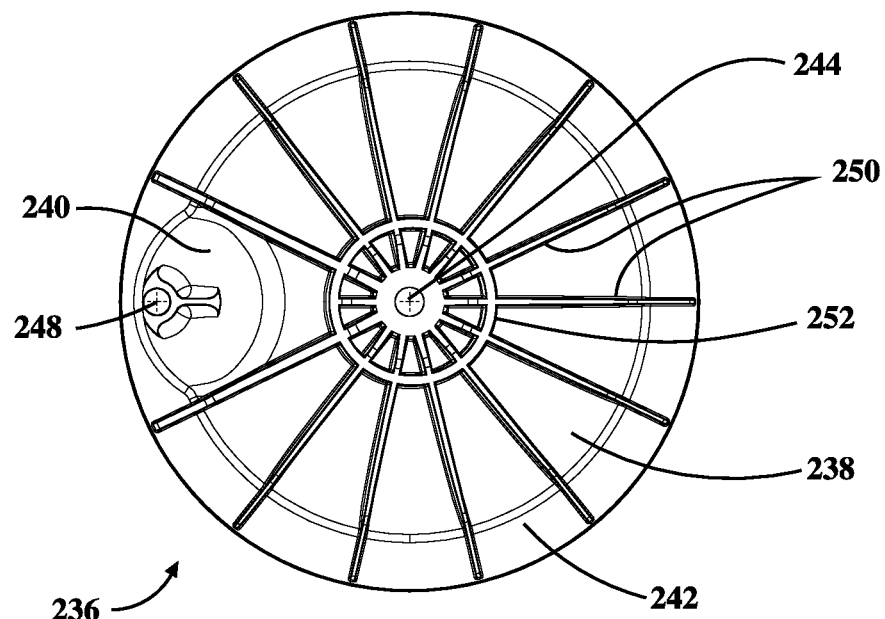
FIG. 36 is a bottom view of the disc member of FIG. 34.
Figure 37:
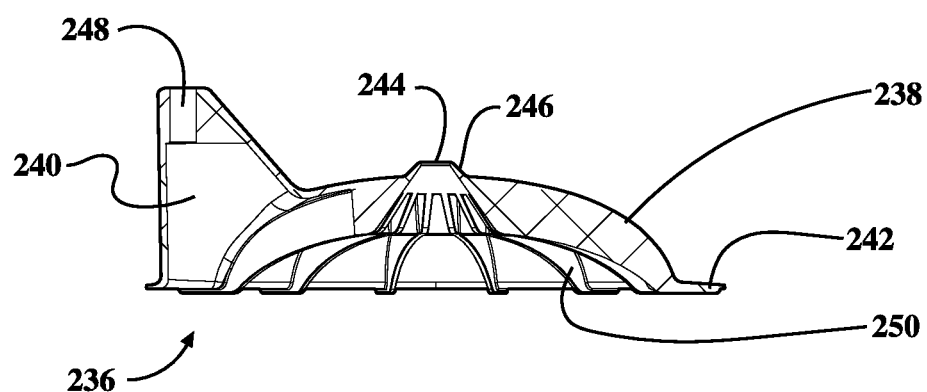
FIG. 37 is a sectional view of the disc member of FIG. 34, which is generally cut along the cutting-plane line B-B in FIG. 35.

Turning again to FIGS. 34-39, it can be seen that the dome-shaped body portion 238 of the disc member 236 further includes a peripheral flange portion 242 disposed about its outer periphery. As most clearly illustrated in FIGS. 38 and 39, the peripheral flange portion 242 of the disc member 236 comprises a plurality of downwardly extending projections 243 spaced apart along the annular bottom surface thereof. In addition, as shown in FIGS. 36 and 37, the bottom surface of the dome-shaped body portion 238 of the disc member 236 may be provided with a plurality of radially-extending ribs 250 that are circumferentially spaced apart about the disc member 236 so as to increase the structural rigidity and durability of the disc member 236. Also, in the bottom view of FIG. 36, it can be seen that the disc member 236 may also include a circumferentially-extending rib 252 circumscribing the central aperture 244 so as to further enhance the structural rigidity and durability of the disc member 236. While a single circumferentially-extending rib 252 is shown in the illustrative embodiment of FIG. 36, it is to be understood that, in other embodiments, the disc member 236 may be provided with a plurality of radially spaced-apart ribs 252 that are concentrically arranged with respect to one another for added strength.

Figure 38:
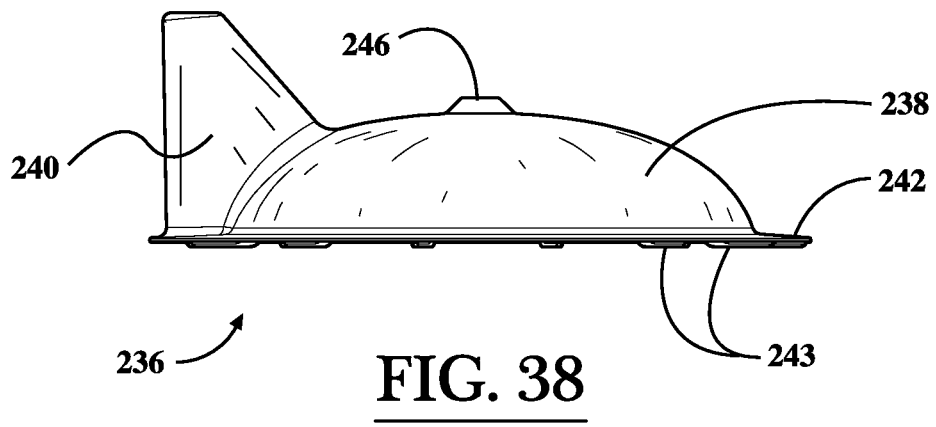
FIG. 38 is a side view of the disc member of FIG. 34.
Figure 39:
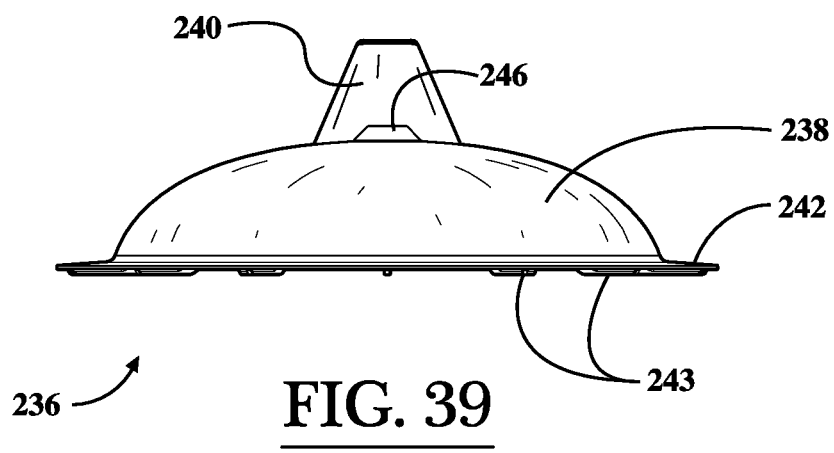
FIG. 39 is an end view of the disc member of FIG. 34.
Figure 40:
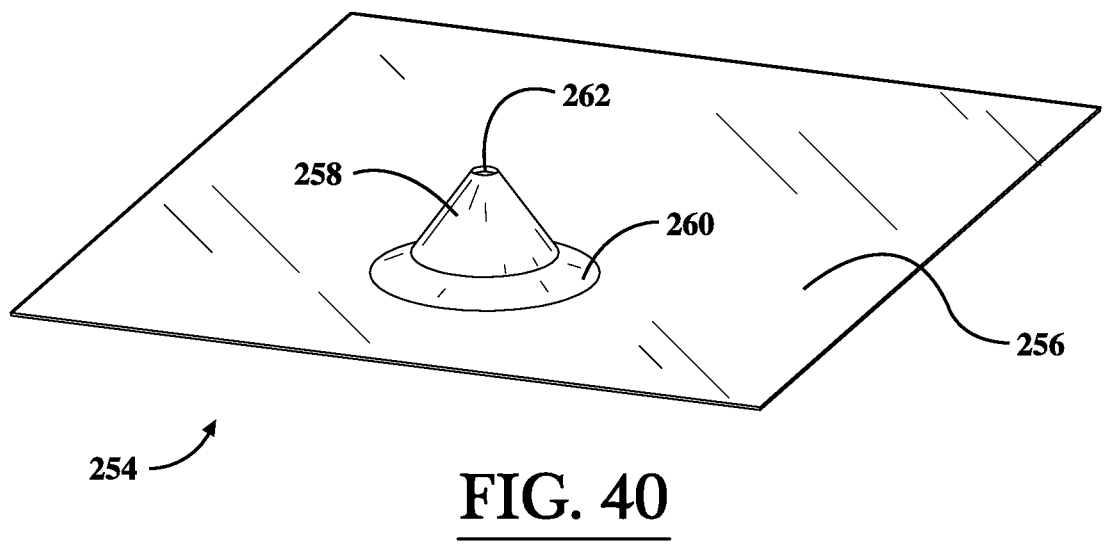
FIG. 40 is a perspective view of a flashing member of the support surface attachment device of FIG. 28.
Figure 41:
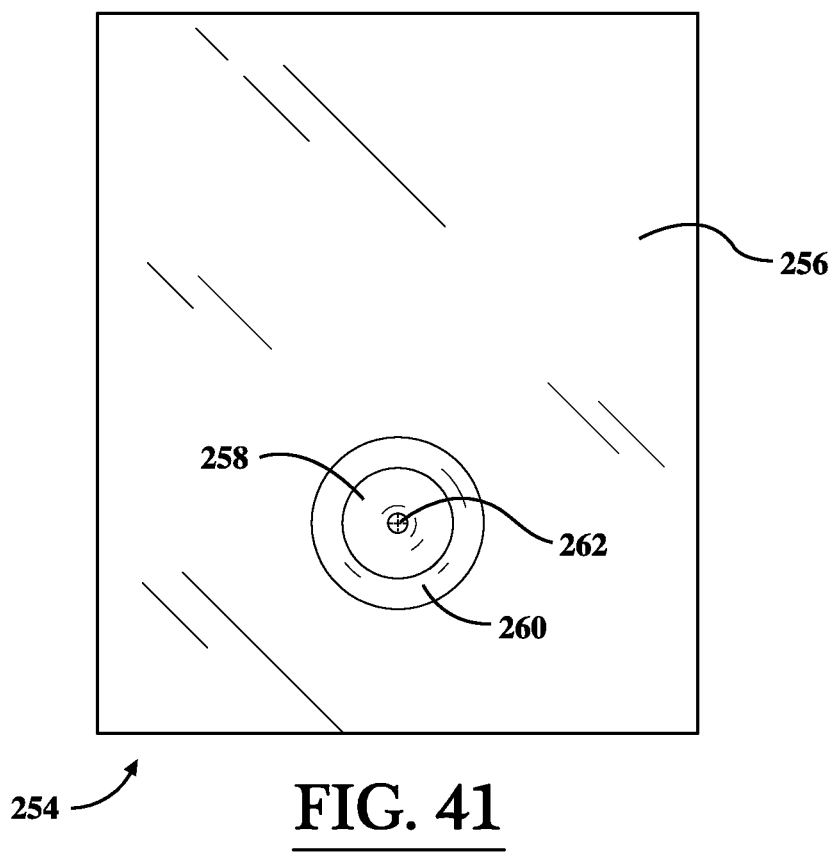
FIG. 41 is a top view of the flashing member of FIG. 40.
Figure 42:
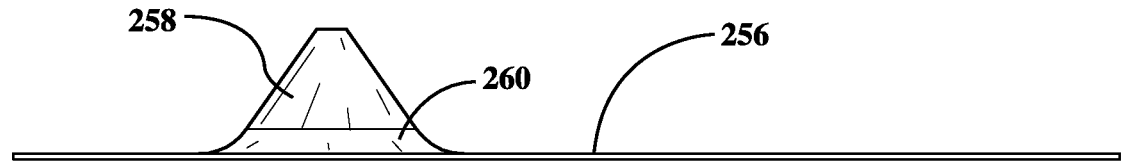
FIG. 42 is a side view of the flashing member of FIG. 40.
Figure 43:
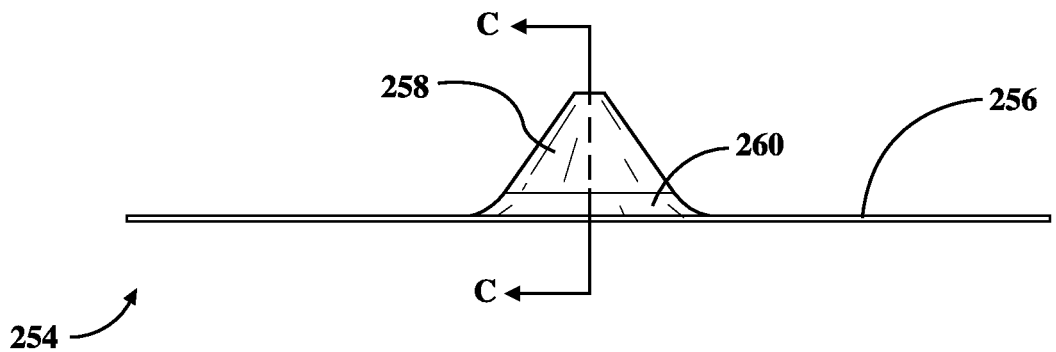
FIG. 43 is an end view of the flashing member of FIG. 40.
Figure 44:
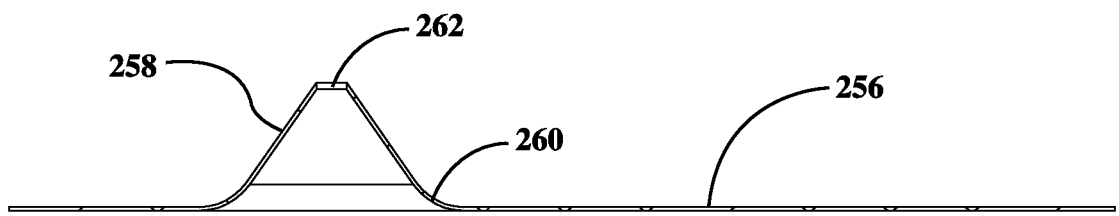
FIG. 44 is a sectional view of the flashing member of FIG. 40, which is generally cut along the cutting-plane line C-C in FIG. 43.

With reference primarily to FIGS. 34, 35, and 38, the conical projection 240 of the disc member 236 will be described in more detail. As shown in these figures, the conical projection 240 is disposed on a side of the dome-shaped body portion 238 and comprises an aperture 248 disposed in the center thereof for receiving the threaded fastener member 228 (e.g., bolt 228) that adjustably connects the clamp assembly 202, 208 to the base assembly 236, 254 of the support surface attachment device 200. As will be described hereinafter, the threaded fastener member 228 can be rotated so as to adjust the vertical position or elevation of the clamp assembly 202, 208 relative to the base assembly 236, 254. The aperture 248 of the conical projection 240 is provided with a plurality of internal threads that threadingly engage with the plurality of external threads on the threaded fastener member 228. In one exemplary embodiment, the disc member 236 may be formed from diecast metal, the structural mounting screw 232 may be formed from stainless steel, and the cone-shaped sealing washer 234 may be formed from ethylene propylene diene monomer (EPDM).

Next, referring to FIGS. 40-44, the plate-like flashing member 254 of the support surface attachment device 200 will be explained. As described above for the flashing member 96, the flashing member 254 helps to maintain the integrity of the building roof 98 by preventing roof leaks. In FIGS. 40-44, it can be seen that the flashing member 254 generally comprises a generally planar body portion 256 and a conical projection 258 that extends upwardly from the generally planar body portion 256 in a generally vertical direction. As best shown in the top view of FIG. 41, the conical projection 258 is offset with respect to the center of the generally planar body portion 256 (i.e., the conical projection 258 is disposed to the side of the central point of the generally planar body portion 256). In FIGS. 40-44, it can be seen that conical projection 258 is provided with an annular base portion 260 disposed around the bottom periphery thereof. The conical projection 258 further includes a centrally disposed aperture 262 for receiving the structural mounting screw 232 therein. Advantageously, the raised nature of the conical projection 258 above the remainder of the generally planar body portion 256 of the flashing member 254 substantially prevents any precipitation (i.e., rain water) from entering the structure of the building roof 98 through the fastener aperture 262. In the assembled state of the support surface attachment device 200, in order to further prevent any leaks through the aperture 262 of the flashing member 254, a cone-shaped grommet 264 (see FIG. 33) is provided on the top of the conical projection 258 of the flashing member 254. The cone-shaped grommet 264 is sandwiched between the conical projection 258 of the flashing member 254 and the bottom surface of the conical wall 246 surrounding the central aperture 244 of the disc member 236 when the disc member 236 is disposed on top of the flashing member 254 in the assembled state of the support surface attachment device 200. In one exemplary embodiment, the flashing member 254 may be formed from stamped metal, and the cone-shaped grommet 264 may be formed from ethylene propylene diene monomer (EPDM).

Advantageously, the design of the flashing member 254 illustrated in FIGS. 40-44 results in superior waterproofing because its water seal is located approximately one (1) inch above the roof surface (i.e., at the tip of the conical projection 258) so that the integrity of the flashing waterproofing is maintained even if the grommet 264 would fail. Also, because the flashing member 254 may be formed by stamping, its manufacturing costs are inexpensive. In addition, the configuration of the flashing member 254 allows adjacent flashing members 254 to be readily stacked for compact shipping.

Figure 28:
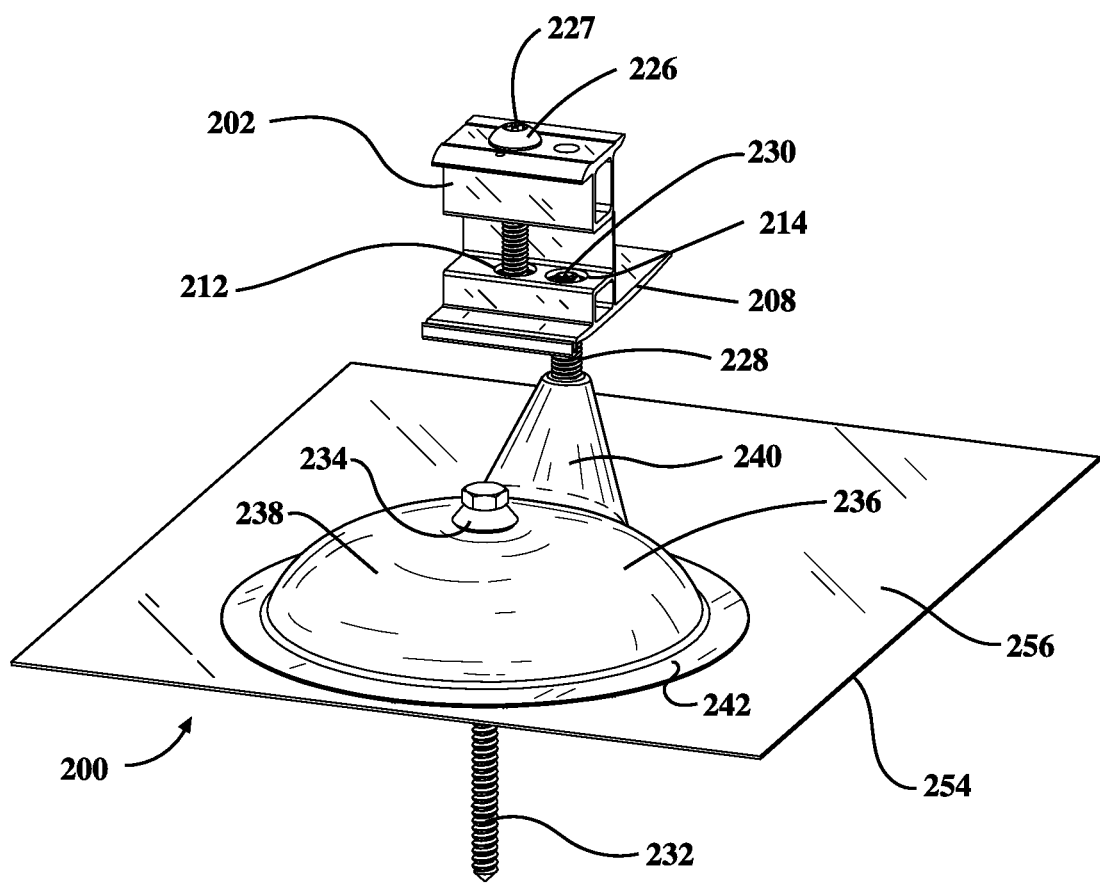
FIG. 28 is a perspective view of another support surface attachment device of a photovoltaic mounting system, according to a second illustrative embodiment of the invention, wherein the support surface attachment device comprises a rotatable disc member for east-west and north-south adjustment.
Figure 29:
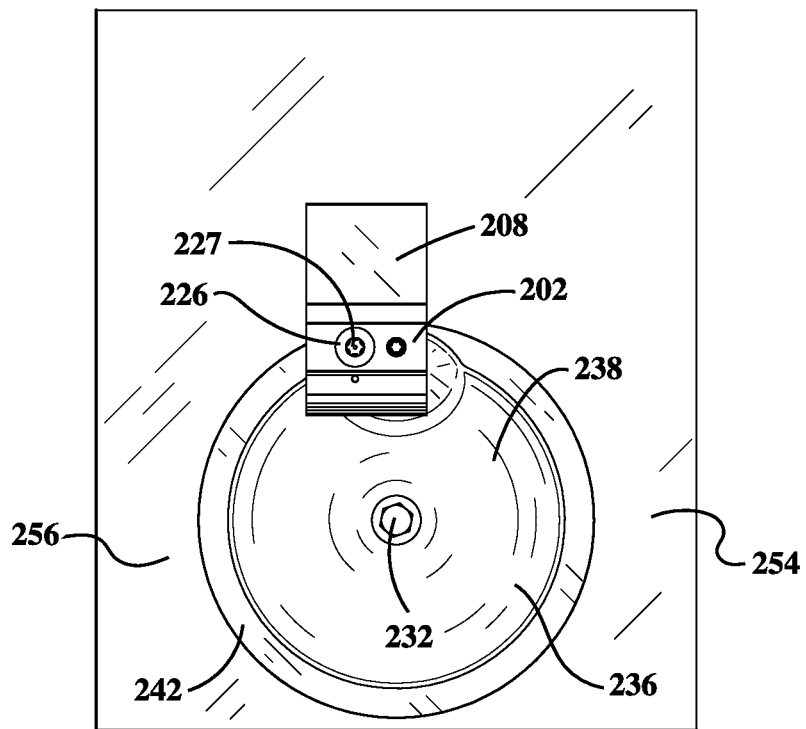
FIG. 29 is a top view of the support surface attachment device of FIG. 28.
Figure 30:
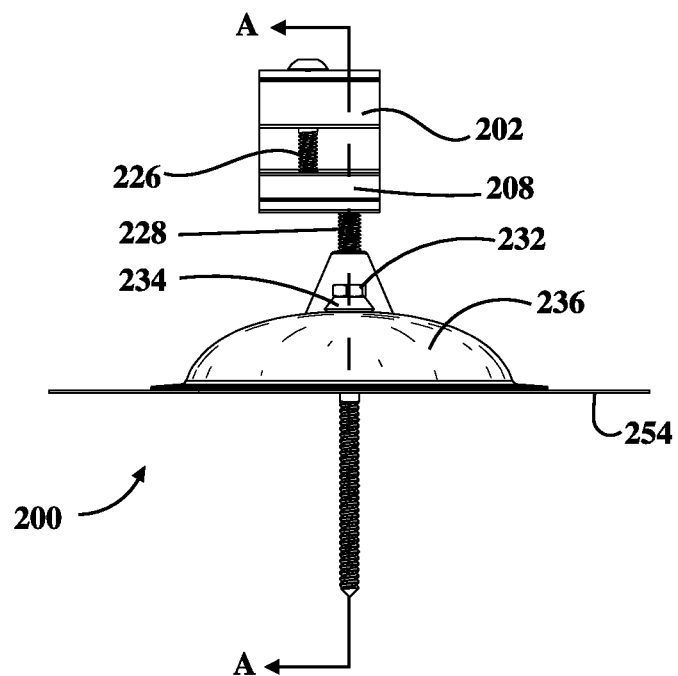
FIG. 30 is an end view of the support surface attachment device of FIG. 28.
Figure 31:
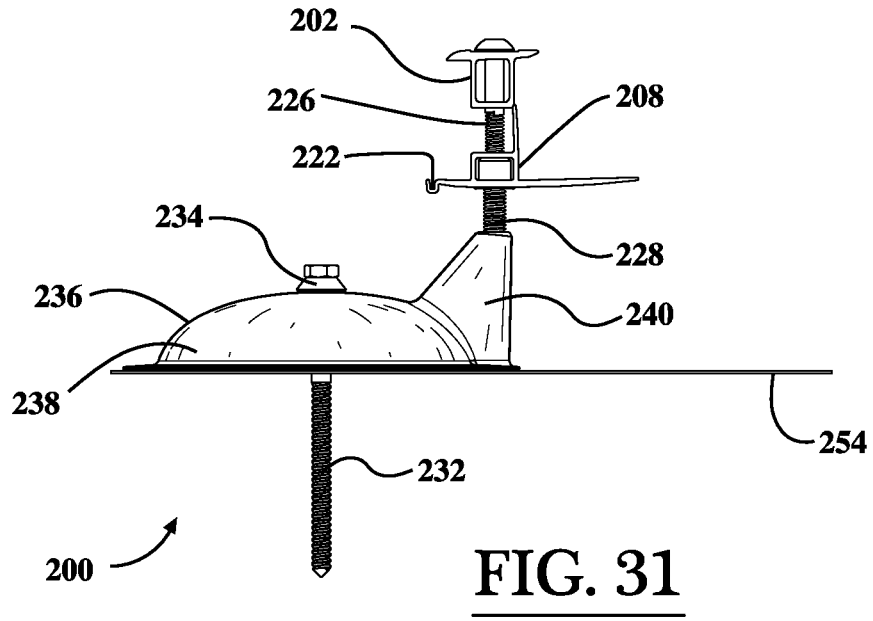
FIG. 31 is a side view of the support surface attachment device of FIG. 28.
Figure 32:
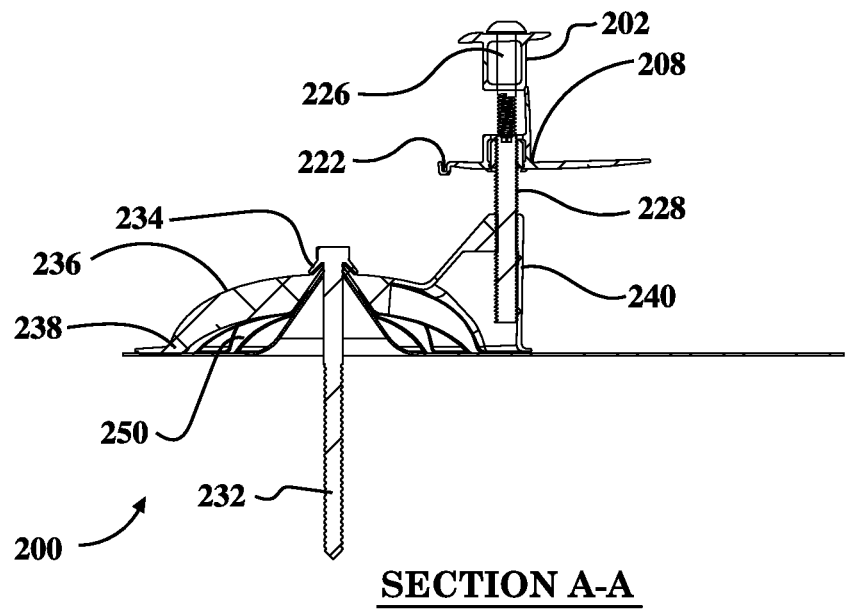
FIG. 32 is a longitudinal sectional view of the support surface attachment device of FIG. 28, which is generally cut along the cutting-plane line A-A in FIG. 30.
Figure 33:
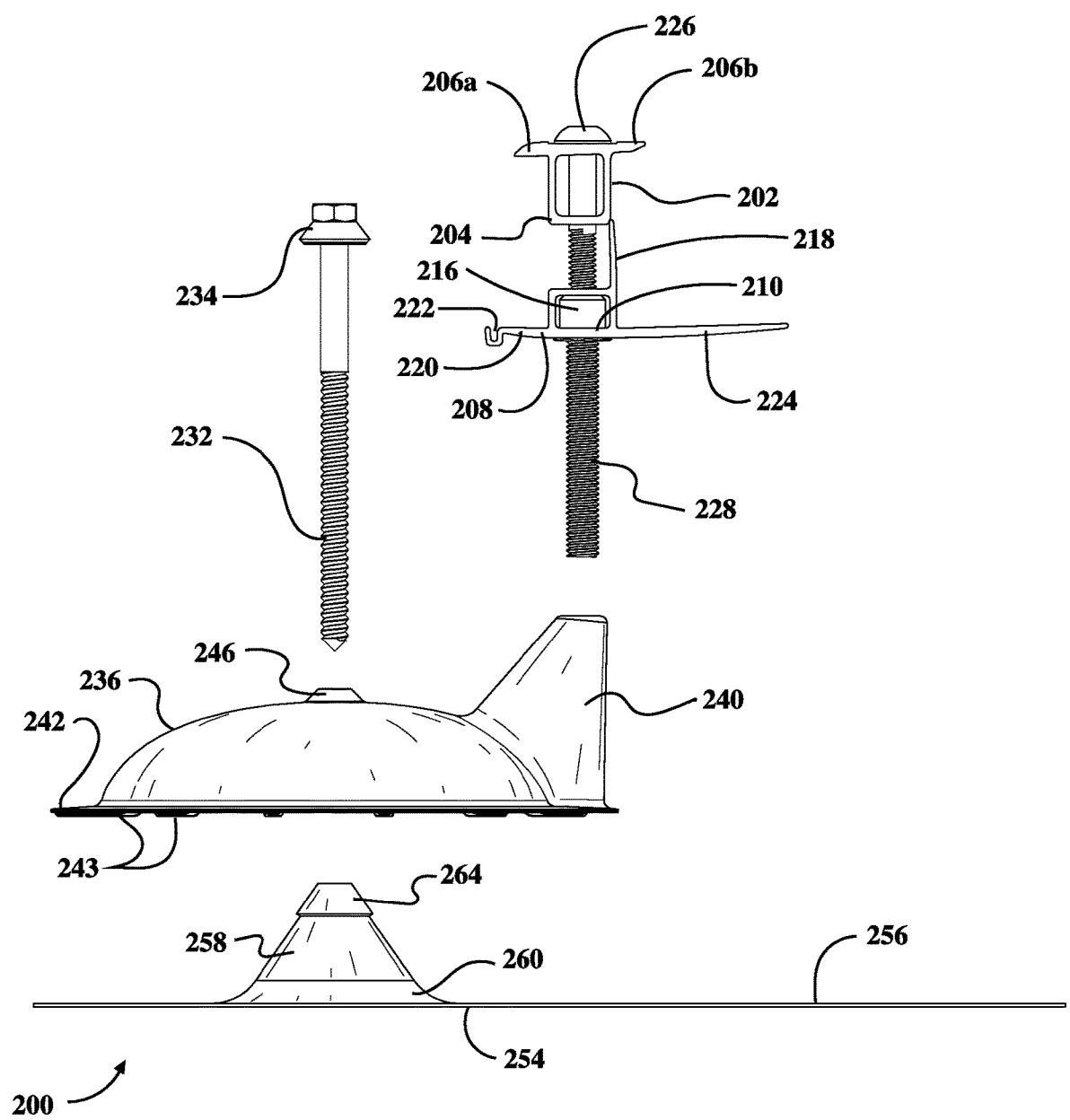
FIG. 33 is a side partial exploded perspective view of the support surface attachment device of FIG. 28.

Now, with particular reference to FIGS. 28-33, the clamp assembly 202, 208 of the support surface attachment device 200 will be explained. As shown in these figures, the clamp assembly generally comprises an upper clamp member 202, a lower clamp member 208, and a threaded fastener member 228 that adjustably connects the clamp assembly to the base assembly 236, 256. As best shown in FIGS. 28, 31, and 33, the upper clamp member 202 is connected to the lower clamp member 208 by a threaded fastening member 226 (e.g., a bolt 226 with external threads disposed on the shaft thereof). Specifically, the shaft of the bolt 226 passes through apertures in each of the clamping components 202, 208, and the bolt 226 is secured in place with a rivet nut at the bottom end thereof. Referring to the partially exploded view of FIG. 33, it can be seen that the bolt 226 passes through upper and lower apertures in the upper clamp member 202, and then through the fastener aperture 212 of the lower clamp member 208 until it reaches the rivet nut at the bottom end of the bolt 226. When it is desired to secure the clamp assembly 202, 208 to one or more photovoltaic modules, a tool (e.g., a screwdriver or a battery-powered drill with the appropriate bit) is inserted into the hexagonal recess 227 in the top end of the bolt 226 and the bolt 226 is tightened until the one or more frames of the one or more photovoltaic modules are securely clamped between the upper and lower clamp members 202, 208.

An illustrative upper clamp member 202 of the clamp assembly 202, 208 is depicted in FIG. 28-33. With combined reference to FIGS. 28 and 33, it can be seen that the upper clamp member 202 generally includes a base portion 204, first and second opposed flange portions 206a, 206b, and an upper planar portion that is disposed between the opposed flange portions 206a, 206b. Both the base portion 204 and upper planar portion of the upper clamp member 202 are provided with a fastener apertures disposed therein for receiving the shaft of the bolt 226. The vertical walls of the upper clamp member 202 that extend upwardly from the base portion 204 generally align with the upright wall portion 218 of lower clamp member 208 that will be described hereinafter. In many respects, the upper clamp member 202 of the second embodiment is similar to that of the upper clamp member 10 of the first embodiment described above.

An illustrative lower clamp member 208 of the clamp assembly 202, 208 is also depicted in FIGS. 28-33. With initial reference to FIG. 33, it can be seen that the lower clamp member 208 generally includes a base portion 210, an upright wall portion 218, and opposed ledges or wings 220, 224 extending outwardly from the outer sides of the base portion 210. The upper shelf of the base portion 210 of the lower clamp member 208 is provided with first and second apertures 212, 214 disposed therein (see FIG. 28) for receiving the threaded fastener member 226 and the rivet nut 216, respectively. Also, as shown in FIGS. 31 and 33, the first opposed ledge or wing 220 is provided with a groove 222 formed therein for receiving the downturned bottom edge of the skirt mounting bracket 110 (see FIG. 19). The upright wall portion 218 of the lower clamp member 208 that extends upwardly from the base portion 210 generally aligns with vertical walls of upper clamp member 202 (see FIGS. 31 and 33). The rivet nut 216 that is received within the aperture 214 in the base portion 210 comprises internal threads for engaging the external threads of the threaded fastener member 228 (e.g., threaded stud 228) that adjusts the height of the clamp assembly 202, 208 relative to the base assembly 236, 254. When it is desired to adjust the height of the clamp assembly 202, 208 relative to the base assembly 236, 254 (e.g., so as to level the PV modules 114 in the array), a tool (e.g., a screwdriver or a battery-powered drill with the appropriate bit) is inserted into the hexagonal recess 230 in the top end of the stud 228 and the stud 228 is rotated either clockwise or counter-clockwise to either raise or lower the clamp assembly 202, 208 relative to the base assembly 236, 254. Similar to that described above for the clamp assembly 50 of the first embodiment (e.g., see FIG. 19), the PV modules 114 rest on one or both of the generally horizontal ledges or wings 220, 224 of the lower clamp member 208 of the clamp assembly 202, 208. The upright wall portion 218 of the lower clamp member 208 helps to keep the upper clamp member 202 in alignment (see FIG. 33), even when the same clamp is used as an end clamp. Except for having a single upright wall portion 218 rather than two spaced-apart vertical walls, the lower clamp member 208 of the second embodiment is similar in many respects to that of the lower clamp member 20 of the first embodiment described above.

Advantageously, the support surface attachment device 200 described above in conjunction with the second embodiment is easy to install, ship to the jobsite, aesthetically pleasing, cost effective to manufacture, and results in a substantial reduction of material usage and part count. The disc member 236, which may be die-cast, allows relatively high manufacturing tolerances to be used, thereby resulting in substantial reduction in fabrication costs. Also, the apertures in the upper and lower clamp members 202, 208 described above may be punched during manufacturing, and computer numerical control (CNC) machining is not required. The support surface attachment device 200 results in a photovoltaic array with superior aesthetics because the spacing between north-south modules is capable of being reduced from approximately 1.25 inches down to approximately 0.625 inches. In addition, the installation of the support surface attachment devices 200 on the building roof is very quick because only a single tool (e.g., a screwdriver or a battery-powered drill with the appropriate bit) is needed for the entire installation.

It is readily apparent that the aforedescribed photovoltaic mounting system offers numerous advantages. First, the photovoltaic mounting system described herein, which generally comprises one or more coupling devices 60 and one or more support surface attachment devices 100, 200, attaches to rafters or roof supporting members, and avoids using rails or struts, and is universal. In other words, the photovoltaic mounting system provides an easy way to install off-the-shelf photovoltaic modules or panels with support surface attachment devices 100, 200 that anchor into roof rafters or trusses, without the need for rails. Secondly, the photovoltaic mounting system mounts to any photovoltaic module on the market, giving installers the flexibility to choose the module of their choice, rather than being required to buy a module with a custom profile rail to accommodate the mounting system. In addition, the photovoltaic mounting system described herein includes integrated grounding means so that wired PV module grounding or bonding is not required (i.e., the metallic constituent components of the coupling devices 60 and the support surface attachment devices 100, 200 form conductive current paths for integrated grounding or bonding). Finally, the photovoltaic mounting system described herein provides installers with easy and efficient means by which the photovoltaic modules in the array can be leveled in the field.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A mounting system for supporting a photovoltaic module on a support surface, said mounting system comprising:
    a support surface attachment device, including a clamp assembly including a lower clamp member and an upper clamp member, said lower clamp member having an outwardly extending component extending from an outer side of said lower clamp member;
    a skirt mounting member including a plurality of first protrusions; and
    a skirt member comprising an upper end portion defining an internal cavity, said skirt member configured to be supported by said clamp assembly,
    wherein the skirt member further includes second protrusions, at least one of the second protrusions on the skirt member being configured to matingly engage at least one of the first protrusions on the skirt mounting member,
    wherein the engagement between the at least one first protrusion and the at least one second protrusion enables the skirt member to be mounted at various heights relative to the outwardly extending component of the lower clamp member so as to accommodate various heights of the photovoltaic module, and
    wherein said skirt mounting member is disposed between said upper end portion of said skirt member and said outwardly extending component of said lower clamp member so as to elevate said skirt member above a top surface of said outwardly extending component.

2. The mounting system according to claim 1, wherein said internal cavity defined by said upper end portion of said skirt member is bounded on at least three sides.

3. The mounting system according to claim 2, wherein said internal cavity defined by said upper end portion of said skirt member is bounded on at least three sides by a diagonal wall, a generally horizontal wall, and a generally vertical wall.

4. The mounting system according to claim 1, wherein said skirt mounting member comprises:
    a downwardly extending portion configured to engage with a groove defined in said outwardly extending component of said lower clamp member of said clamp assembly,
    wherein said skirt member is configured to engage with said upper clamp member of said clamp assembly.

5. The mounting system according to claim 1, wherein said upper clamp member of said clamp assembly of said support surface attachment device is connected to said lower clamp member by a threaded fastening member.

6. The mounting system according to claim 5, wherein said upper clamp member comprises an upper flange portion, said outwardly extending component of said lower clamp member and said upper flange portion of said upper clamp member together defining a clamp recess configured to receive said skirt member and skirt mounting member.

7. The mounting system according to claim 6, wherein said lower clamp member further comprises at least one vertical wall coupled to said outwardly extending component, and said upper clamp member further comprises a base portion extending downwardly from said upper flange portion, said base portion of said upper clamp member overlapping said at least one vertical wall of said lower clamp member.

8. The mounting system according to claim 1, wherein said support surface attachment device further comprises a rotatable base member, said rotatable base member coupled to said clamp assembly, said rotatable base member being pivotal about a central rotational axis, and said rotatable base member configured to be attached to a support surface.

9. The mounting system according to claim 8, further comprising a flashing member having a fastener aperture defined therein configured to receive a fastener for attaching said rotatable base member and said flashing member to said support surface, said fastener aperture being disposed through a raised position of said flashing member so that water is prevented from passing through said fastener aperture.

10. A support surface attachment device, the support surface attachment device configured to attach a photovoltaic module to a support surface, the support surface attachment device comprising:
a clamp assembly including a lower clamp member and an upper clamp member, the lower clamp member having an outwardly extending component extending from an outer side thereof;
a skirt mounting member including a plurality of first protrusions; and
a skirt member including an upper end portion defining an internal cavity, the skirt member configured to be supported by the clamp assembly,
wherein the skirt member further includes second protrusions, at least one of the second protrusions on the skirt member being configured to matingly engage at least one of the first protrusions on the skirt mounting member,
wherein the engagement between the at least one first protrusion and the at least one second protrusion enables the skirt member to be mounted at various heights relative to the outwardly extending component of the lower clamp member so as to accommodate various heights of the photovoltaic module, and
wherein the skirt mounting member is configured to be disposed between the upper end portion of the skirt member and the outwardly extending component of the lower clamp member so as to elevate the skirt member above a top surface of the outwardly extending component.

11. The support surface attachment device of claim 1, wherein the internal cavity defined by the upper end portion of the skirt member is bounded on at least three sides.

12. The support surface attachment device of claim 11, wherein the internal cavity defined by the upper end portion of the skirt member is bounded on at least three sides by a diagonal wall, a generally horizontal wall, and a generally vertical wall.

13. The support surface attachment device of claim 10, wherein the skirt mounting member further includes a downwardly extending portion configured to engage with a groove defined in the outwardly extending component of the lower clamp member of the clamp assembly; and
wherein the skirt member is configured to engage with the upper clamp member of the clamp assembly.

14. The support surface attachment device of claim 10, wherein the upper clamp member of the clamp assembly of the support surface attachment device is connected to the lower clamp member by a threaded fastening member.

15. The support surface attachment device of claim 14, wherein the upper clamp member includes an upper flange portion, the outwardly extending component of the lower clamp member and the upper flange portion of the upper clamp member together defining a clamp recess configured to receive the skirt member and skirt mounting member.

16. The support surface attachment device of claim 15, wherein the lower clamp member further includes at least one vertical wall coupled to the outwardly extending component, and the upper clamp member further includes a base portion extending downwardly from the upper flange portion, the base portion of the upper clamp member overlapping the at least one vertical wall of the lower clamp member.

17. The support surface attachment device of claim 10, wherein the support surface attachment device further includes a rotatable base member, the rotatable base member coupled to the clamp assembly, the rotatable base member being pivotal about a central rotational axis, and the rotatable base member configured to be attached to a support surface.

18. The support surface attachment device of claim 17, further comprising a flashing member having a fastener aperture defined therein configured to receive a fastener for attaching the rotatable base member and the flashing member to the support surface, the fastener aperture being disposed through a raised position of the flashing member so that water is prevented from passing through the fastener aperture.

19. A mounting system comprising:
a photovoltaic module having an overall thickness being defined between a bottommost surface of the photovoltaic module and a topmost surface of the photovoltaic module;
a support surface attachment device configured to attach the photovoltaic module to a support surface, the support surface attachment device including:
a lower support member,
an upper support member, and
a clamp assembly coupled to the upper support member by a fastener member, the clamp assembly including:
an upwardly tapered lower ledge extending from a first outer side of the clamp assembly, and
an upper flange portion, the upwardly tapered lower ledge and the upper flange portion together defining a clamp recess for receiving the overall thickness of the photovoltaic module;
a skirt mounting member including a first protrusions; and
a skirt member, the skirt member including:
an upper end portion defining an internal cavity, the skirt member configured to be supported by the clamp assembly; and
a plurality of second protrusions, at least one of the second protrusions on the skirt member configured to matingly engage at least one of the first protrusions on the skirt mounting member,
wherein the engagement between the first protrusions and the second protrusions enables the skirt member to be mounted at various heights relative to an outwardly extending component of a lower clamp member so as to accommodate various heights of the photovoltaic module, and
wherein the skirt mounting member is disposed between the upper end portion of the skirt member and the outwardly extending component of the lower clamp member so as to elevate the skirt member above a top surface of the outwardly extending component.

20. The mounting system of claim 19, wherein:
the clamp recess has a first height toward an inner side of the clamp recess and a second height toward an outer side of the clamp recess,
the first height is greater than the overall thickness, and
the upwardly tapered lower ledge is configured to function as a spring so as to securely retain the photovoltaic module in the clamp assembly by compensating for a difference between the first height and the overall thickness.

* * * * *